US010462321B2

(12) United States Patent
Nishida

(10) Patent No.: US 10,462,321 B2
(45) Date of Patent: Oct. 29, 2019

(54) SCANNER AND SCANNER DATA GENERATING METHOD

(71) Applicant: SEIKO EPSON CORPORATION, Tokyo (JP)

(72) Inventor: Kazutoshi Nishida, Fukuoka (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/001,993

(22) Filed: Jun. 7, 2018

(65) Prior Publication Data

US 2018/0359384 A1 Dec. 13, 2018

(30) Foreign Application Priority Data

Jun. 9, 2017 (JP) ................................. 2017-114065

(51) Int. Cl.
| | |
|---|---|
| *H04N 1/00* | (2006.01) |
| *H04N 1/04* | (2006.01) |
| *G02B 5/00* | (2006.01) |
| *G02B 5/124* | (2006.01) |
| *G02B 26/12* | (2006.01) |
| *H04N 1/03* | (2006.01) |

(52) U.S. Cl.
CPC ......... *H04N 1/00997* (2013.01); *G02B 5/003* (2013.01); *G02B 5/124* (2013.01); *G02B 26/126* (2013.01); *H04N 1/0305* (2013.01); *H04N 1/0306* (2013.01); *H04N 1/04* (2013.01)

(58) Field of Classification Search
CPC . H04N 1/00997; H04N 1/0306; G02B 26/126
See application file for complete search history.

(56) References Cited

U.S. PATENT DOCUMENTS

| 6,069,741 A | * | 5/2000 | Osawa | ..................... B41J 2/465 |
| | | | | 250/363.04 |
| 2003/0030923 A1 | * | 2/2003 | Hsu | ..................... G02B 26/126 |
| | | | | 359/857 |
| 2003/0164995 A1 | * | 9/2003 | Hsu | ......................... H04N 1/03 |
| | | | | 358/509 |
| 2004/0057097 A1 | * | 3/2004 | Huang | .................. G02B 17/02 |
| | | | | 359/212.1 |
| 2009/0147321 A1 | * | 6/2009 | Minobe | ............. H04N 1/02815 |
| | | | | 358/475 |
| 2010/0284045 A1 | * | 11/2010 | Kawano | ................. G03B 27/50 |
| | | | | 358/474 |
| 2011/0038019 A1 | * | 2/2011 | Kawano | .............. H04N 1/0306 |
| | | | | 358/475 |

(Continued)

FOREIGN PATENT DOCUMENTS

| EP | 2166743 A1 | * | 3/2010 | ............ G03B 27/50 |
| EP | 2166743 A1 |   | 3/2010 | |

(Continued)

OTHER PUBLICATIONS

The Extended European Search Report for the corresponding European Patent Application No. 18176495.2 dated Dec. 3, 2018.

*Primary Examiner* — Ted W Barnes

(57) ABSTRACT

A scanner having: a first mirror having multiple concavities configured to reflect light from a document; a sensor configured to sense light reflected by a concavity of the first mirror; and a wall disposed to the first mirror and protruding from between the multiple concavities.

10 Claims, 16 Drawing Sheets

(56) References Cited

U.S. PATENT DOCUMENTS

| | | | | |
|---|---|---|---|---|
| 2013/0155472 | A1* | 6/2013 | Kawano | G03G 15/60 358/450 |
| 2013/0314754 | A1* | 11/2013 | Shiraishi | H01L 27/14629 358/475 |
| 2018/0035001 | A1* | 2/2018 | Murase | H04N 1/02835 |
| 2018/0152581 | A1* | 5/2018 | Murase | H04N 1/0306 |

FOREIGN PATENT DOCUMENTS

| | | | | |
|---|---|---|---|---|
| EP | 2259566 A1 | | 12/2010 | |
| EP | 2259566 B1 | * | 6/2018 | H04N 1/0306 |
| JP | 2005070519 A | * | 3/2005 | |
| JP | 2013-131794 A | | 7/2013 | |
| JP | 2013131794 A | * | 7/2013 | G03G 15/60 |

* cited by examiner

SCANNER AND SCANNER DATA GENERATING METHOD

BACKGROUND

1. Technical Field

The present invention relates to a scanner and method of generating scanning data.

2. Related Art

A scanner configured to read image segments that partially overlap on a main scanning line by means of sensor chips corresponding to the individual segments, and generate scanning data for the main scanning line by synthesizing scanning data from plural segments respectively read by the plural sensor chips, is known from the literature. See, for example, JP-A-2013-131794.

When concave mirrors corresponding one-to-one to each segment are disposed to the optical path through which light from segments partially overlapping each other in the main scanning line of a document, light (referred to below as stray light) other than the intended light from the segments the concave mirrors are designed to reflect may be incident to the concave mirrors. If stray light is reflected by a concave mirror and incident to the sensor, the image quality of the scanning data drops.

SUMMARY

An objective of the present invention is to improve the image quality of scanning data.

To achieve the foregoing objective, a scanner according to the invention has a first mirror having multiple concavities configured to reflect light from a document; a sensor configured to sense light reflected by a concavity of the first mirror; and a wall disposed to the first mirror and protruding from between the multiple concavities.

The wall in this configuration can block unwanted light (stray light), that is, light other than light from the part of a document corresponding to each concavity, from reaching the sensor. As a result, stray light striking the sensor can be prevented, and a drop in image quality due to stray light can be prevented.

Preferably in a scanner according to another aspect of the invention, the sensor includes multiple sensor chips corresponding one-to-one with the concavities of the first mirror; and light from a defined range of a main scanning line of the document is reflected by a first concavity of the first mirror and input to a first sensor chip corresponding to the first concavity, and is reflected by a second concavity of the first mirror and input to a second sensor chip corresponding to the second concavity.

In this configuration, the area of the document on the main scanning line read by the first sensor chip, and the area read by the second sensor chip, overlap in part (the range of overlap is referred to as the defined range herein). This configuration can therefore generate scanning data for one main scanning line by synthesizing the scanning data in the range corresponding to the first sensor chip, and the scanning data in the range corresponding to the second sensor chip, based on the scanning data from the defined range.

Preferably in a scanner according to another aspect of the invention, the first concavity and the second concavity are aligned adjacently in a main scanning direction; the sensor chips are aligned in the main scanning direction; and the wall protrudes from between the first concavity and the second concavity to a height Hdm equal to $(0<H_{dm}<L-(q+W_{dm})/(2 \tan \theta_2))$ where: L is a distance to the first mirror from a virtual plane, which is a position where an image formed through the first mirror on the sensor chip is in focus; q is the length of the defined range on the main scanning line in the virtual plane; $\theta_2$ is the angle, in a plane including a principal ray from an end of the defined range and the main scanning line, between a perpendicular to the main scanning line and the principal ray; and $W_{dm}$ is a width in the main scanning direction of the wall disposed to a position equidistant from the first concavity and the second concavity.

This aspect of the invention enables configuring a wall of a height that does not block at least the principal rays from the ends of the defined range.

Preferably, a scanner according to another aspect of the invention also has a second mirror having multiple concavities, and configured to reflect to the sensor, by corresponding concavities, light reflected by the multiple concavities of the first mirror; and an aperture that is different from the walls and is positioned between the first mirror and the second mirror on the optical path.

Separately from an aperture provided between the first mirror and second mirror for the purpose of adjusting the amount of light incident to the sensor, this configuration provides walls located on the document side of the aperture in the optical path for the purpose of keeping stray light from striking the first mirror. Stray light on the document side of the aperture is therefore blocked by the walls.

Preferably, a scanner according to another aspect of the invention also has a second wall disposed to the second mirror and protruding from between multiple concavities of the second mirror.

In addition to walls protruding from between the concavities of the first mirror, this configuration also has walls protruding from between the concavities of the second mirror. As a result, stray light can be blocked even more effectively.

Preferably, a scanner according to another aspect of the invention also has a third mirror having multiple concavities configured to reflect light from the document to a concavity corresponding to the first mirror; and an aperture that is different from the walls and is positioned between the third mirror and the first mirror on the optical path.

Separately from an aperture provided between the third mirror and first mirror for the purpose of adjusting the amount of light incident to the sensor, this configuration provides walls located on the sensor side of the aperture in the optical path for the purpose of keeping stray light from striking the first mirror. Stray light on the sensor side of the aperture is therefore blocked by the walls.

Preferably, in a scanner according to another aspect of the invention, the walls are adjacent to concavities of the first mirror on both sides of the wall.

Stray light is thereby blocked by the walls adjacent to concavities of the first mirror on both sides of the wall.

Preferably, in a scanner according to another aspect of the invention, the walls protrude from a ridge between concavities of the first mirror.

Because the bottom of the wall conforms to the shape of the ridge and the wall protrudes from the ridge without a gap therebetween, even if there is a gap, the wall can prevent stray light being incident to the concavity from the gap.

Preferably, in a scanner according to another aspect of the invention, a protruding end of the wall is shaped conforming to the shape of the ridge formed by concavities of the first mirror.

This configuration blocks stray light by a wall that is disposed between adjacent concavities and has a concave shape conforming to the shape (concave) of the ridge formed by adjacent concavities.

To achieve the foregoing objective, another aspect of the invention is a scanning data generating method that is used by a scanner including a first mirror having multiple concavities configured to reflect light from a document, a sensor configured to sense light reflected by a concavity of the first mirror, and a wall disposed to the first mirror and protruding from between the multiple concavities; and includes steps of reading the document by the sensor and generating scanning data of the document.

This method can block, by a wall, unwanted light (stray light), that is, light other than light from the part of a document corresponding to each concavity, from reaching the sensor. As a result, stray light striking the sensor can be prevented, and a drop in image quality due to stray light can be prevented.

Other objects and attainments together with a fuller understanding of the invention will become apparent and appreciated by referring to the following description and claims taken in conjunction with the accompanying drawings.

DESCRIPTION OF EMBODIMENTS

A preferred embodiments of the present invention are described below in the following order: (1) scanner configuration, (2) shield wall configuration, (2-1) walls of a first mirror, (2-2) walls of an aperture member, (2-3) walls of a second mirror, (2-4) walls of a sensor substrate, (3) scanning process, (4) other embodiments.

(1) Scanner Configuration

Figure 1:
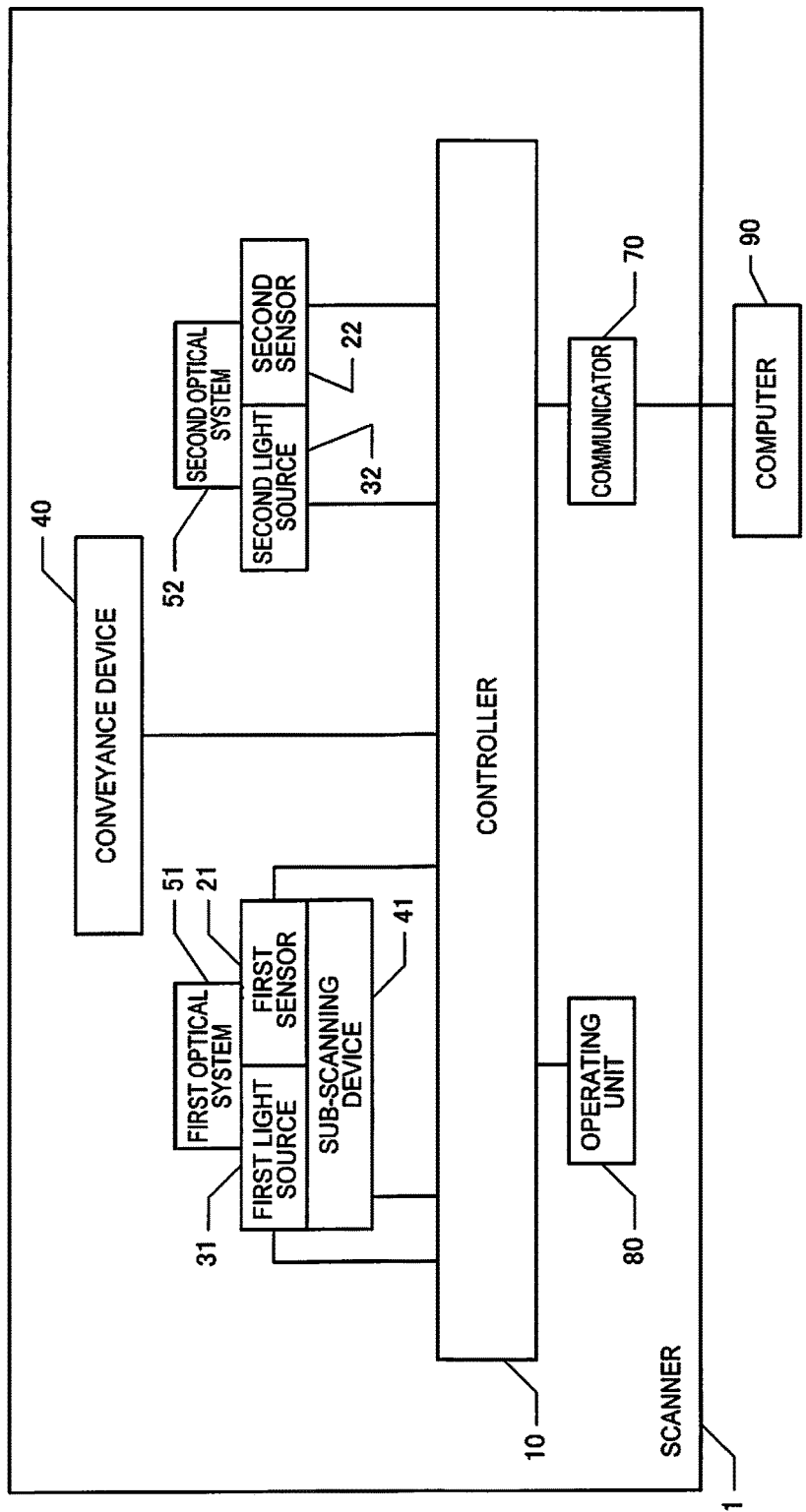
FIG. 1 is a block diagram of a scanner.

FIG. 1 is a block diagram of a scanner 1 according to this embodiment of the invention. The scanner 1 includes a controller 10, conveyance device 40, communicator 70, operating unit 80, computer 90, and a 2-channel reading unit (including light sources, sensors, and optical units). The controller 10 includes a recording medium not shown, and a processor that reads and executes a program from the recording medium. The processor may be a dedicated circuit device such as an ASIC embodied by circuits executing a specific process, or a CPU and ASIC that work together.

The controller 10 controls parts of the scanner 1, and generates scanning data based on output from a reading unit. An operating unit 80 includes an output unit that provides information to the user, and an input unit for receiving input from the user. The controller 10 controls the operating unit 80 to display on the output unit information for selecting scanning conditions and instructing scanning, for example. Based on output from the output unit, the user can select scanning conditions and input start-scanning commands.

When a start-scanning command is input, the controller 10 controls parts of the scanner 1 to execute the operations for scanning a document (such as conveying the document). When scanning data is output from the reading unit by this operation, the controller 10 generates scanning data.

The communicator 70 is a device for communicating with an external device (an external computer 90 in this example), and the controller 10 can send desired information to the computer 90 and receive instructions and information from the computer 90.

In this embodiment of the invention, when the controller 10 produces scanning data, the controller 10 sends the scanning data through the communicator 70 to the computer 90. The scanning data may obviously be used in many ways, and may be stored on a recording medium not shown of the scanner 1, stored on a removable recording medium, or sent through the communicator 70 to a device other than the computer 90.

The scanner 1 according to this embodiment has both an automatic document feeder (ADF) not shown, and a scanning platen, and documents are scanned at the scanning position regardless of which is used. The scanner 1 according to this embodiment has a first reading unit and a second reading unit. The first reading unit can scan both moving documents (the front or first side) that are conveyed by the ADF, and stationary documents that are placed by the user directly on the scanning platen. The second reading unit can scan moving documents (the back or second side, the opposite side as the front), and cannot scan stationary documents.

The first reading unit includes, as shown in FIG. 1, a first sensor 21, a first light source 31, a sub-scanning device 41, and a first optical system 51. The sub-scanning device 41 is a device for moving the first sensor 21, first light source 31, and first optical system 51 bidirectionally in the sub-scanning direction.

The second reading unit includes, as shown in FIG. 1, a second sensor 22, a second light source 32, and a second optical system 52, and does not have a device equivalent to the sub-scanning device 41. More specifically, the second sensor 22, second light source 32, and second optical system 52 are stationary inside the scanner 1. Light from the second light source 32 is emitted to a specific position in the conveyance path of the moving document, and light from the moving document passes through the second optical system 52 and is sensed by the second sensor 22 to image the document.

The first sensor 21 and second sensor 22 comprise multiple sensor chips. Each sensor chip forms a line sensor, which is a sensor extending in one direction, and comprises numerous photoelectric conversion elements arrayed in the one direction. In this embodiment, each sensor chip has photoelectric conversion elements arranged in three rows, and a red (R), green (G), and blue (B) color filter is respectively disposed to the photoelectric conversion elements in each row. In this embodiment of the invention, the direction in which the rows of photoelectric conversion elements extend is perpendicular to the sub-scanning direction (the conveyance direction of a moving document). The direction in which the photoelectric conversion elements are arrayed is referred to as the main scanning direction.

The multiple sensor chips of the first sensor 21 are disposed at a specific interval in the main scanning direction.

The multiple sensor chips of the second sensor 22 are disposed adjacently in the main scanning direction, and the interval between adjacent photoelectric conversion elements in different sensor chips is the same as the interval between photoelectric conversion elements in a sensor chip at a different position. In the second sensor 22, therefore, the multiple sensor chips are arrayed adjacently, and effectively form a line sensor for scanning one line in the main scanning direction.

The first light source 31 and second light source 32 each have a lamp that emits light to a scanning area (exposure position) in the conveyance path of the moving document. When a document is scanned as a stationary document, the exposure position moves in the sub-scanning direction. Light reflected from the object (a document or white calibration plate, for example) located at the exposure position is received by the sensor chips of the first sensor 21 or second sensor 22, and the sensor chips generate signals corresponding to the amount of light received by each photoelectric conversion element.

The first sensor 21 and second sensor 22 have an analog front end, not shown. The analog front end includes a circuit that applies gain to the signals output by the photoelectric conversion elements according to the amount of light received, and an analog/digital conversion (ADC) circuit. The analog front end in this example also has a recording medium for recording information indicating the gain, and the analog front end, based on the gain information, adjusts the gain of the black level of the first sensor 21 and second sensor 22 to the lowest output value, and the white level to the highest output level.

Note that in this embodiment the first light source 31 and second light source 32 are light sources that output white light. Because the photoelectric conversion element arrays of the first sensor 21 and second sensor 22 are equipped with RGB color filters, the first sensor 21 and second sensor 22 can generate RGB scanning data based on the light from a document exposed to white light.

The conveyance device 40 is a mechanism that conveys documents. The conveyance device 40 conveys the moving document to the position exposed to light from the first light source 31, and the position exposed to light from the second light source 32, and then conveys the moving document out from the scanner 1.

Figure 2:
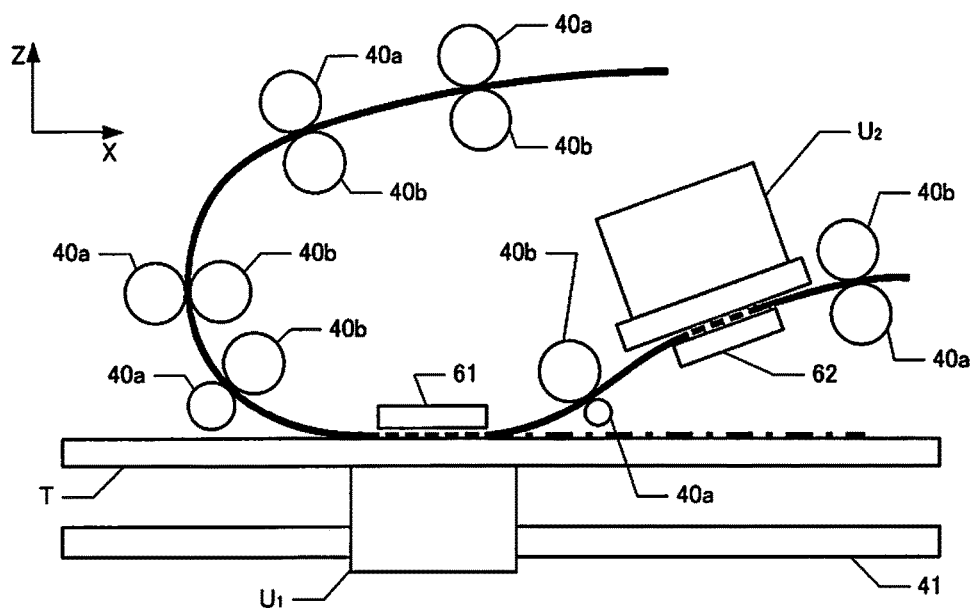
FIG. 2 illustrates the configuration around the conveyance mechanism of the scanner.

FIG. 2 schematically illustrates the conveyance path of the conveyance device 40. The conveyance path comprises plastic members not shown forming the path of the moving document, and a moving document is conveyed through the conveyance path by opposing conveyance rollers 40a, 40b disposed at multiple positions along the path. The conveyance path is indicated by the curve of the heavy solid line in FIG. 2. The exposure positions on the conveyance path are indicated by the dotted lines, and one line in the main scanning direction (direction perpendicular to the X-axis and Z-axis) is read at the exposure position by the first sensor 21 and second sensor 22.

FIG. 2 schematically illustrates the conveyance path of the conveyance device 40. The conveyance path comprises plastic members not shown forming the path of the moving document, and a moving document is conveyed through the conveyance path by opposing conveyance rollers 40a, 40b disposed at multiple positions along the path. The conveyance path is indicated by the curve of the heavy solid line in FIG. 2. The exposure positions on the conveyance path are indicated by the dotted lines, and one line in the main scanning direction (direction perpendicular to the X-axis and Z-axis) is read at the exposure position by the first sensor 21 and second sensor 22.

Light from the area of one line on a document is therefore split into light from multiple areas of which the ends in the main scanning direction overlap, and each of the split light beams is focused on a sensor chip. As a result, in this embodiment of the invention, the output from the sensor chips of the first sensor 21 must be synthesized to generate one line of scanning data. A merging mark used as an index for synthesizing data is therefore formed on the calibration plate 61 in this embodiment of the invention.

The merging mark is formed at a position where areas overlap at the ends of adjacent areas, and by scanning the merging mark when a document is not on the platen, the photoelectric conversion elements that read the same position can be identified in the output of the sensor chips.

The calibration plate 61 includes a white calibration plate and a black calibration plate for gain adjustment, the white level is determined based on the result measured with the white calibration plate, and the black level is determined based on the result measured with the black calibration plate. Note that the calibration plate 61 may be configured with a moving part, and disposed so that the target selected from among the merging mark, white calibration plate, and black calibration plate is moved by the moving part and set to the exposure position.

Like calibration plate 61, calibration plate 62 also has a white calibration plate and a black calibration plate.

In FIG. 2, the sub-scanning device 41 is a device capable of moving the first unit U1 bidirectionally in the sub-scanning direction (X-axis). When scanning a moving document, the sub-scanning device 41 sets the first unit U1 to a defined position as shown in FIG. 2. The document is then scanned with the first unit U1 at this specific position.

When scanning a stationary document set on the scanning platen T (that is, when scanning on a flat bed), the sub-scanning device 41 moves the first sensor 21, first light source 31, and first optical system 51 in the sub-scanning direction to scan the document. In the case of a stationary document, therefore, the area indicated in FIG. 2 by the dotted line and the dot-dash line connected to the dotted line is the exposure position (the document scanning range), and the exposure position can move in the sub-scanning direction.

The second sensor 22, second light source 32, and second optical system 52 of the second reading unit are disposed in the second unit U2 shown in FIG. 2. When scanning a moving document, one side (the front) is read by the first unit U1, and the other side (the back) is read by the second unit U2 when necessary. In this embodiment of the invention, the second reading unit (second unit U2) is a CIS (contact image sensor).

The first optical system 51 includes an optical member (reduction optics system) for reducing and converging an image of the document on the first sensor 21. More specifically, the first optical system 51 has a member forming an optical path guiding, to the sensor chip, light from the document produced by the first light source 31 emitting light to the document. The optical path may be configured in many ways, and can be configured from combinations of various members, including an aperture member, lenses, and mirrors.

Figure 3:
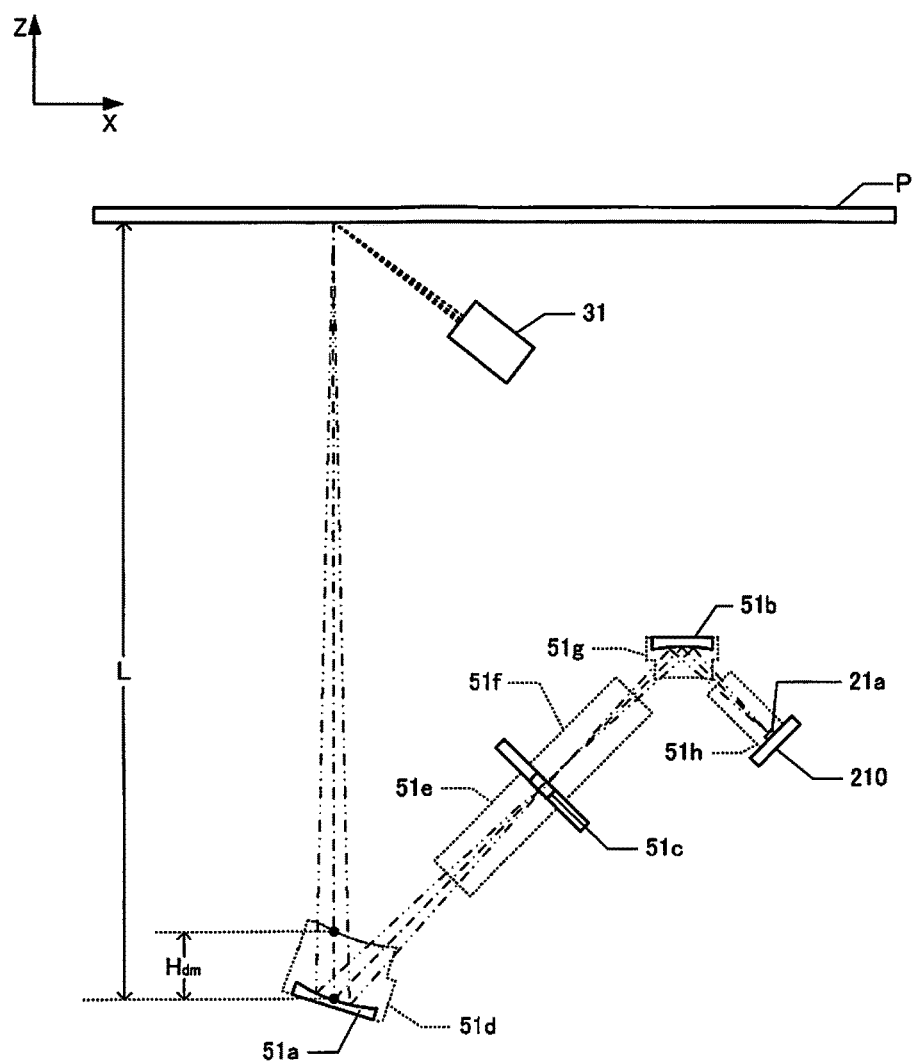
FIG. 3 illustrates the configuration of an optical system of the scanner.

FIG. 3 illustrates the first optical system 51 in this embodiment of the invention as viewed parallel to the main scanning direction. The configuration in FIG. 3 shows the first light source 31 that emits light to the document P, first optical systems 51 (51a to 51h), and a first sensor 21.

A first optical system 51 uses configurations include a first mirror 51a with multiple concavities, a second mirror 51b with multiple concavities, an aperture member 51c having multiple openings that function as apertures; and walls (51d to 51h) for blocking stray light; and guides the light to the sensor chip 21a by splitting the light from one line in the main scanning direction of the document P (the direction perpendicular to the X-axis and Z-axis) into multiple areas that overlap in part in the main scanning direction, and reducing the image of each area.

Note that in FIG. 3 the light beam reflected from a desired on the main scanning line (scan line) is indicated by the three lines. More specifically, the principal ray, which is the light ray in the center of the light beam, is indicated by a dot-dash line, and the rays on the outside of the light beam are indicated by the dot-dot-dash lines.

Figure 4:
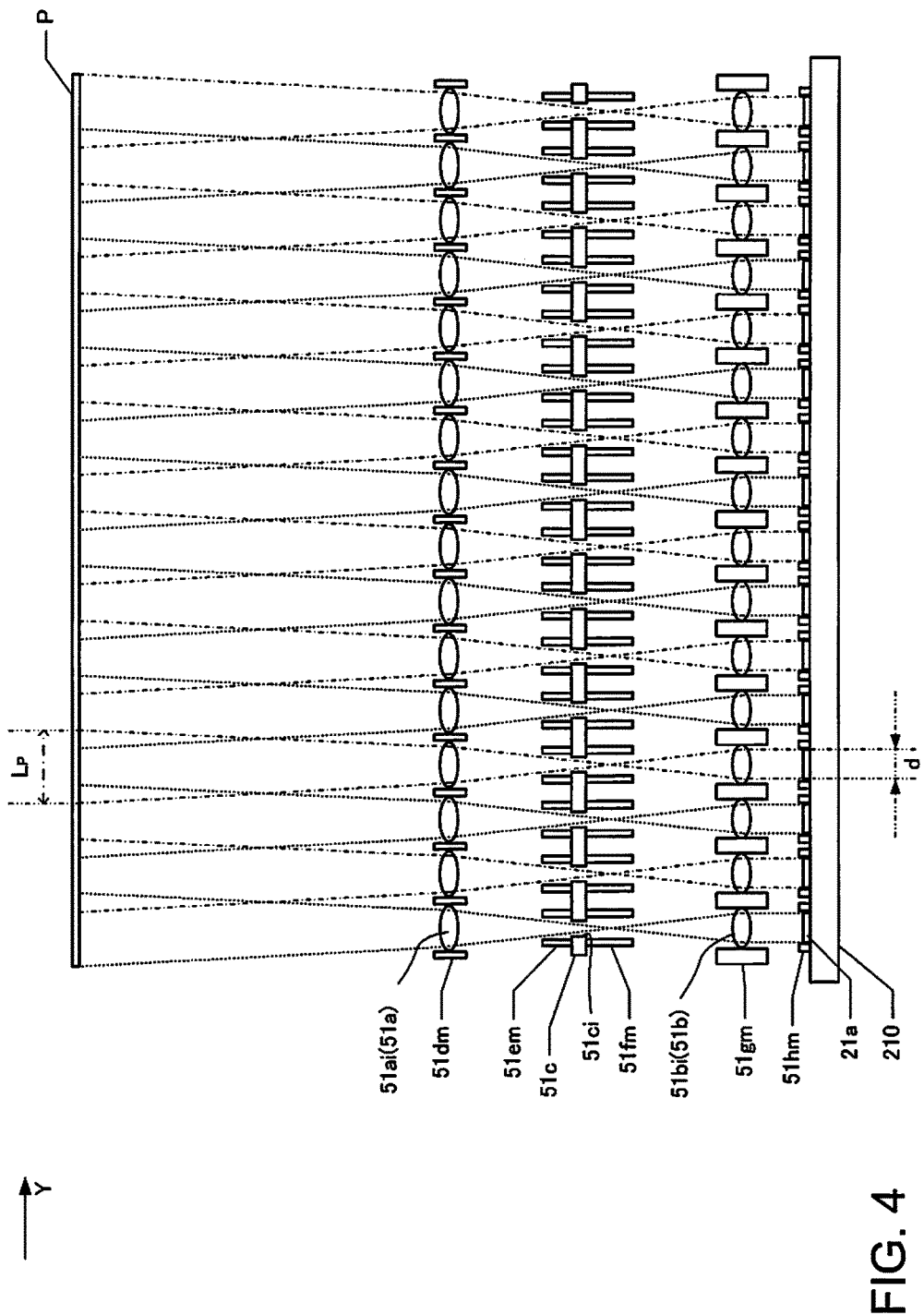
FIG. 4 schematically illustrates image reduction by the optical system.

FIG. 4 schematically illustrates the operation of the optical system with the main scanning direction on the horizontal axis. Because understanding would be complicated if the incident beam and outgoing beam overlapped, the concavity 51ai of the first mirror 51a, and the concavity 51bi of the second mirror 51b, are represented by ovals representing replacement by equivalent lenses with the outgoing beam leaving the lens from the opposite side from which the incident beam enters. As shown in the figure, there is a one-to-one correlation between the concavity 51ai of each first mirror 51a and the aperture 51ci (opening) of the corresponding aperture member 51c. The concavities 51ai of the first mirrors 51a and the concavities 51bi of the second mirrors 51b also correspond one-to-one. The sensor chips 21a of the first sensor 21 are disposed to a substrate 210.

In FIG. 4, light from the document P passes the first optical system 51 and is guided to the sensor chip 21a, and the path of light from the document P is indicated schematically by the dotted lines and dot-dash lines. In other words, the sensor chip 21a extends in the main scanning direction (Y-axis), and images of adjacent parts of the document P that partially overlap in the main scanning direction are reduced in the parts of the first optical system 51 corresponding to those parts of the document P. The images from each area of the document P are then focused on the sensor chip 21a corresponding to those parts. More specifically, an image of the area of length LP in the main scanning direction is focused on a sensor chip 21a of length d.

That one-to-one imaging optics that form images on the second sensor 22 without reducing the size are used in the second optical system 52. The controller 10 therefore does not need to apply the synthesizing process to the output of the second sensor 22, and applies another imaging process (such as cropping or edge enhancement) to acquire the scanning data.

However, because the first sensor 21 reads same positions on the document P multiple times, the controller 10 must synthesize data output from adjacent sensor chips where the outputs coincide to generate the scanning data. More specifically, the controller 10, based on the read results of the merging mark formed on the calibration plate 61, superimposes the outputs of the sensor chips 21a. More specifically, as shown in FIG. 4, the first sensor 21 is embodied by multiple sensor chips 21a, and the multiple sensor chips 21a are disposed to different positions.

Figure 5:
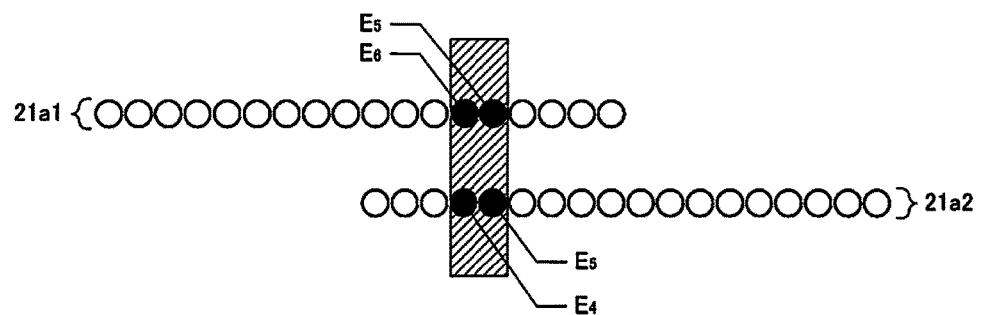
FIG. 5 describes data synthesis.

When the same positions are read by different sensor chips 21a, the same positions are read at the ends of the sensor chips 21a. Because these same positions are where the merging marks are disposed on the calibration plate 61, when the merging mark is read without a document present, each sensor chip 21a outputs data capturing the merging mark. FIG. 5

FIG. 5 schematically illustrates the photoelectric conversion elements of the sensor chip 21a, the black dots denoting the photoelectric conversion elements. In FIG. 5, the merging mark is a line extending in the sub-scanning direction, and the areas around the merging mark are white.

The merging mark is read by each pair of adjacent sensor chips 21a. In FIG. 5, the photoelectric conversion elements of the sensor chips 21a that read the merging mark are indicated by black dots, the merging mark is indicated by hatching, and the photoelectric conversion elements that read the merging mark are shown overlapping. One of the adjacent sensor chips 21a is located on the top left side, the other is located on the bottom right side, and the sensor chips 21a are shown schematically so that the photoelectric conversion elements that read the merging mark are vertically aligned. One of the two adjacent sensor chips 21a is referred to below as first sensor chip 21a1, and the other as second sensor chip 21a2.

The first sensor chip 21a1 and second sensor chip 21a2 output, as serial data, signals corresponding to the amount of light detected by the photoelectric conversion elements aligned in the main scanning direction. In this example, the controller 10 analyzes the output of the first sensor chip 21a1, and determines that the merging mark was detected by the fifth and sixth photoelectric conversion elements E5, E6 from the end. The controller 10 also analyzes the output of the second sensor chip 21a2, and determines that the merging mark was detected by the fourth and fifth photoelectric conversion elements E4, E5 from the end. In this case, the controller 10 determines that the fifth and sixth photoelectric conversion elements E5, E6 of the first sensor chip 21a1, and the fourth and fifth photoelectric conversion elements E4, E5 of the second sensor chip 21a2, read the same position, and in memory not shown stores the locations of the corresponding elements in each sensor chip 21a.

The controller 10 applies the above process sequentially from the end of the sensor chips 21a in the main scanning direction, and identifies the location of the photoelectric conversion elements that read the same position in each sensor chip 21a. Note that of the multiple sensor chips 21a embodying the first sensor 21, any of the sensor chips other than the sensor chips at the ends may be either a first sensor chip 21*a*1 or a second sensor chip 21*a*2.

For example, if one sensor chip 21*a* is the first sensor chip 21*a*1 and then becomes the adjacent second sensor chip 21*a*2 such that the second sensor chip 21*a*2 is treated as the first sensor chip 21*a*1, the sensor chip 21*a* adjacent thereto on the opposite side becomes the second sensor chip 21*a*2.

Once the locations of the photoelectric conversion elements reading the same position are determined as described above, the next time a document P is scanned, the controller 10 generates one line of scanning data by synthesizing the outputs of the sensor chips 21*a* based on their respective positions.

(2) Shield Wall Configuration

The first optical system 51 has walls (51*d* to 51*h*) for preventing stray light, which is light other than the light on the optical paths shown in FIG. 3 and FIG. 4, from being incident to the sensor chips 21*a*.

(2-1) Walls of a First Mirror

Figure 6:
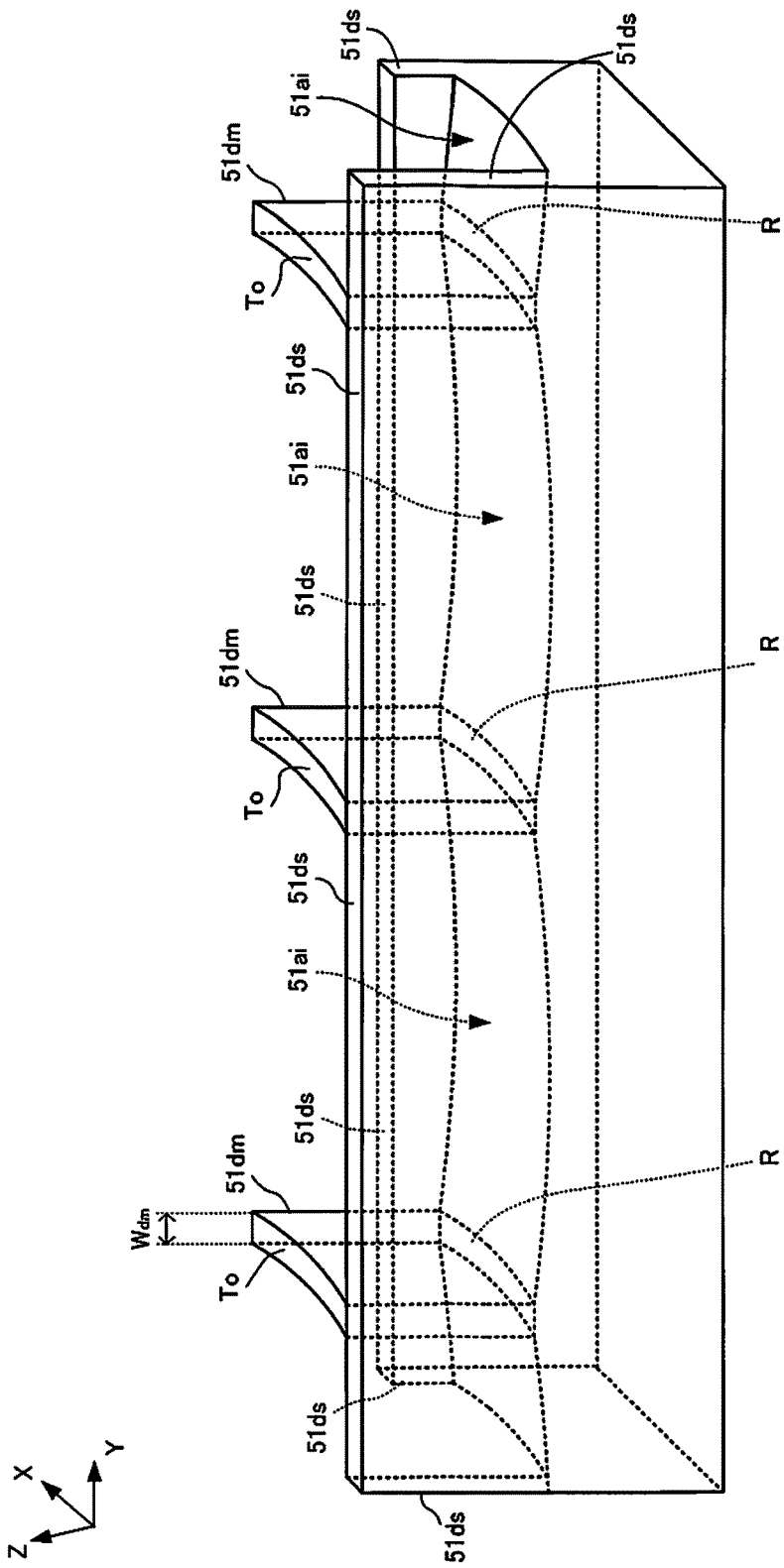
FIG. 6 is an oblique view of the walls of the first mirror.

Walls 51*d* shown in FIG. 3 are shield walls disposed to the first mirror 51*a*. As shown in FIG. 6, walls 51*d* include walls 51*dm*, and walls 51*ds* connecting one wall 51*dm* with the adjacent wall 51*dm*. The walls 51*dm* are disposed adjacent to two adjacent concavities. The walls 51*dm* protrude from the ridge line R between two adjacent concavities, and there is no gap between the ridge line R and the walls 51*dm* (the bottom of the wall 51*dm* is in contact with the ridge line R). In other words, the walls 51*ds* from a grid pattern (or a ladder shape) when seen from the Z-axis, and one concavity can be seen from one opening between walls 51*ds*. The protruding distal ends To of the walls 51*dm* have a concave shape conforming the shape of the ridge line R. The walls 51*ds* and walls 51*dm* surround the edges of the concavity 51*ai*. By connecting the walls 51*ds* and walls 51*dm*, the strength of the walls 51*dm* increases, and the angle of the walls 51*dm* to the optical path is stabilized.

The shape (wall thickness and height) of the walls 51*dm* is described below with reference to FIG. 7.

Figure 7:
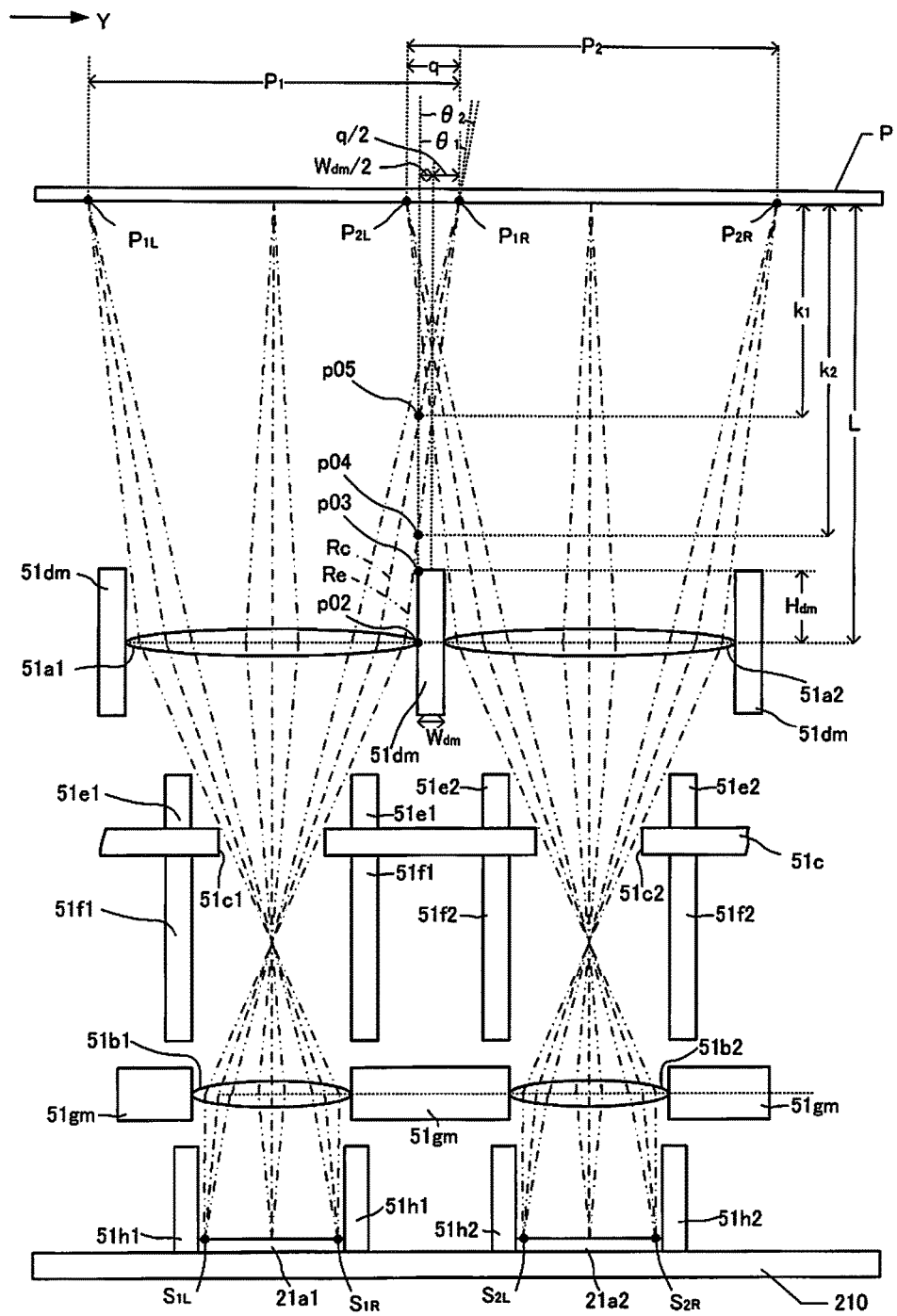
FIG. 7 schematically illustrates the optical paths and walls.

FIG. 7 schematically illustrates the configuration of the walls on the optical path through which light reflected from the document P is guided to a sensor chip 21*a*. Of the multiple concavities of the first mirror 51*a*, the target concavity is referred to as the first concavity 51*a*1, and the concavity adjacent to the first concavity 51*a*1 is referred to as the second concavity 51*a*2. In FIG. 7, the concavity of the first mirror 51*a* and the concavity of the second mirror 51*b* are represented by convex lenses.

In FIG. 7, the light beam (conical shapes) representing light reflected from a desired position on the main scanning line (scan line) of the document P are indicated by the three lines (the principal ray, which is the light ray in the center of the light beam, indicated by a dot-dash line, and the rays on the outside of the light beam indicated by the dot-dot-dash lines).

The thickness (width $W_{dm}$) of the walls 51*dm* in this example is constant, and the wall 51*dm* between a first concavity 51*a*1 and a second concavity 51*a*2 is disposed to a position equidistant from the first concavity 51*a*1 and second concavity 51*a*2.

Light reflected from range P1 (the range from end $P_{1L}$ to end $P_{1R}$) on the main scanning line of the document P is incident to the first sensor chip 21*a*1 through the first concavity 51*a*1 of the first mirror 51*a*, the first aperture 51*c*1, and the first concavity 51*b*1 of the second mirror 51*b*.

Light reflected from range P2 (the range from end $P_{2L}$ to end $P_{2R}$) on the main scanning line of the document P is incident to the second sensor chip 21*a*2 through the second concavity 51*a*2 of the first mirror 51*a*, the second aperture 51*c*2, and the second concavity 51*b*2 of the second mirror 51*b*.

The overlapping portions (referred to below as the defined range) of the range P1 and second range P2 are read by both the first sensor chip 21*a*1 and the second sensor chip 21*a*2.

The length of the defined range in the main scanning direction is length q.

Light reflected from the end $P_{1R}$ of the defined range on the second concavity 51*a*2 side is incident to the first sensor chip 21*a*1 at end $S_{1L}$ of the first sensor chip 21*a*1 (the end farthest from the second sensor chip 21*a*2).

Light reflected from the end $P_{2L}$ of the defined range on the first concavity 51*a*1 side is incident to the second sensor chip 21*a*2 at the photoelectric conversion element at the end $S_{2R}$ of the second sensor chip 21*a*2 farthest from the first sensor chip 21*a*1.

Note that light reflected from end $P_{1R}$ of the defined range is incident to the photoelectric conversion element on the opposite end of the first sensor chip 21*a*1 as end $S_{2R}$ of the second sensor chip 21*a*2; and light reflected from end $P_{2L}$ of the defined range is incident to the photoelectric conversion element on the opposite end of the second sensor chip 21*a*2 as end $S_{1L}$ of the first sensor chip 21*a*1.

When a wall 51*dm* is not disposed between the concavities of the first mirror 51*a*, some of the light reflected by the second concavity 51*a*2 of the first mirror 51*a* passing through the adjacent first aperture 51*c*1 instead of the second concavity 51*a*2 of the first mirror 51*a* may not be preventable, possibly resulting in a drop in image quality due to stray light. However, this problem can be prevented by the walls 51*dm*. While the height of the walls 51*dm* is preferably as great as possible to prevent this problem from occurring, the following limits can be defined to ensure that light from the imaging areas (range P1 and second range P2, for example) on the main scanning line defined for each concavity is reflected by the target concavity.

More specifically, if the target is first concavity 51*a*1, the wall height must be limited to a height at which at least the principal ray from the end $P_{1R}$ on the second concavity 51*a*2 side of the defined range where range P1 and second range P2 overlap is not blocked. Therefore, the wall 51*dm* disposed between the first concavity 51*a*1 and second concavity 51*a*2 of the first mirror 51*a* protrudes from point p02 on the ridge line R to height Hdm defined by equation (1).

$$0 < Hdm < L - (q + W_{dm})/(2 \tan \theta_2) \quad (1)$$

In equation (1), L is the distance from a virtual plane, which is the position where the image formed through the first mirror 51*a* on the sensor chip 21*a* is in focus, to the first mirror 51*a*. The relative positions of the scanning platen T (not shown in FIG. 7) and first optical system 51 are designed so that the document P is positioned on this virtual plane. The following description supposes that the read side of the document P is position on this virtual plane. More specifically, length L is the distance from point p02 to the document P end $P_{1R}$ on a plane parallel to the XZ plane.

Note that as shown in FIG. 6, the first mirror 51*a* is disposed extending in the main scanning direction (Y-axis), and the walls 51*dm* protrude from the ridge line R of the first mirror 51*a* in the direction parallel to the XZ plane.

Point p02 is described below with reference to FIG. 8 and FIG. 9.

Figure 8:
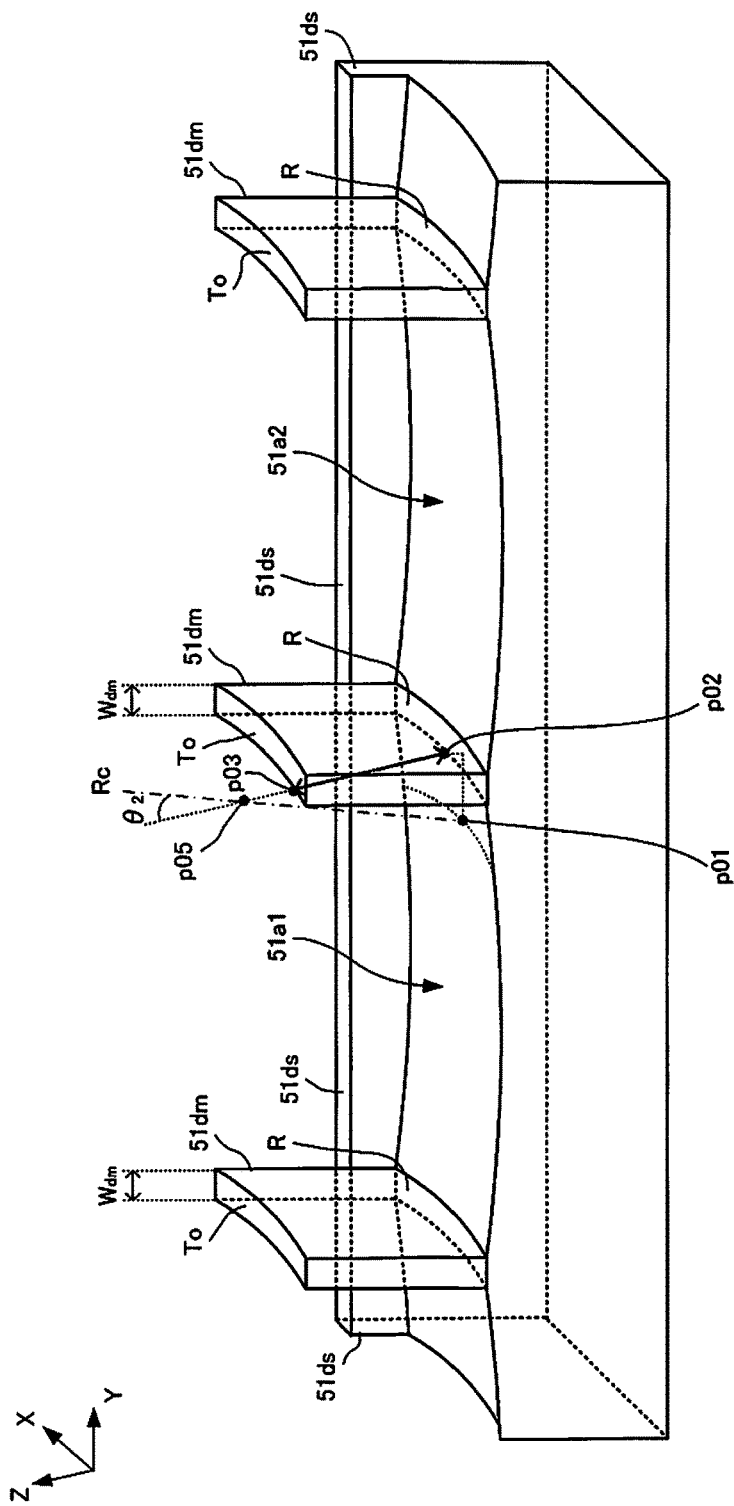
FIG. 8 is an oblique view describing the height of walls in the first mirror.

FIG. 8 is an oblique view of the first mirror 51a omitting for clarity the wall 51ds shown on the −X-axis side in the oblique view in FIG. 6. FIG. 9 schematically illustrates the wall 51dm between the first concavity 51a1 and the second concavity 51a2 as seen from the −Y-axis side to the +Y-axis side.

Point p01 is the point where the principal ray Rc of the light reflected from the second concavity 51a2 side end $P_{1R}$ (see FIG. 7) of the defined range, which is where range P1 and second range P2 overlap, is incident to the first concavity 51a1. The principal ray Rc from end $P_{1R}$ projected to the side (a plane parallel to the XZ plane) of the wall 51dm on the first concavity 51a1 side is ray Rcc as shown in FIG. 9. Point p02 is at the intersection of ray Rcc and the ridge line (see FIG. 8 and FIG. 9) on the first concavity side of the ridge line R formed by the first concavity 51a1 and second concavity 51a2.

As shown in FIG. 7, $\theta_2$ in equation (1) is the angle, in a plane including the main scanning line of the document P and the principal ray Rc incident to the first concavity 51a1 from end $P_{1R}$, between the perpendicular to the main scanning line and the principal ray Rc.

$W_{dm}$ is the width in the main scanning direction (Y-axis) of the wall 51dm located equidistantly from the first concavity 51a1 and second concavity 51a2. Point p05 is the intersection between ray Rcc and principal ray Rc. Note that the Y coordinate of the center of the length q of the defined range on the Y-axis, and the Y coordinate of the center of the wall 51dm on the Y-axis, are the same, and wall 51dm is parallel to the XZ plane. Therefore, $(q+W_{dm})/(2 \tan \theta_2)$ in equation (1) means the length of line k1. As shown in FIG. 9, therefore, the wall 51dm is formed so that the length (height Hdm) from point p02 parallel to the ray Rcc is less than (L−k1). By making the height Hdm of the wall 51dm less than (L−k1), the wall 51dm can be configured to not obstruct at least the principal ray Rc incident to the first concavity 51a1 from the end $P_{1R}$ of the defined range.

If at least the principal ray Rc in the light beam incident to the first concavity 51a1 side from the end $P_{1R}$ is not blocked by the wall 51dm, data can be synthesized using the merging mark even if ray Re on the outside side of the light beam from the principal ray Rc and closest to the second concavity 51a2 side are blocked by the wall 51dm. More specifically, data can be synthesized using a merging mark in scanning data with a reduced amount of light around the merging mark. In addition, because the light beam of the reflected light from the end $P_{1R}$ detected by the second sensor chip 21a2 includes rays on the outside side of the principal ray, the image quality of scanning data after synthesis of the position at the end $P_{1R}$ is not affected. Note that the height Hdm of the wall 51dm from point p02 can be set to a height not obstructing ray Re if height Hdm satisfies equation (2) below.

$$0<Hdm<L-(q+W_{dm})/(2 \tan \theta_1). \quad (2)$$

As shown in FIG. 7, in equation (2), $\theta_1$ is the angle, in a plane (the same plane as the plane including the main scanning line and principal ray Rc) including the main scanning line of the document P and the ray Re closest to the second concavity 51a2 side of the light beam incident to the first concavity 51a1 from end $P_{1R}$, between the perpendicular to the main scanning line and the principal ray Re.

Point p04 is the intersection of ray Rcc (ray Re from end $P_{1R}$ projected to the side (a plane parallel to the XZ plane) of the wall 51dm on the first concavity 51a1 side) and ray Re. In equation (2), $(q+W_{dm})/(2 \tan \theta_2)$ means the length of line k2.

Figure 9:
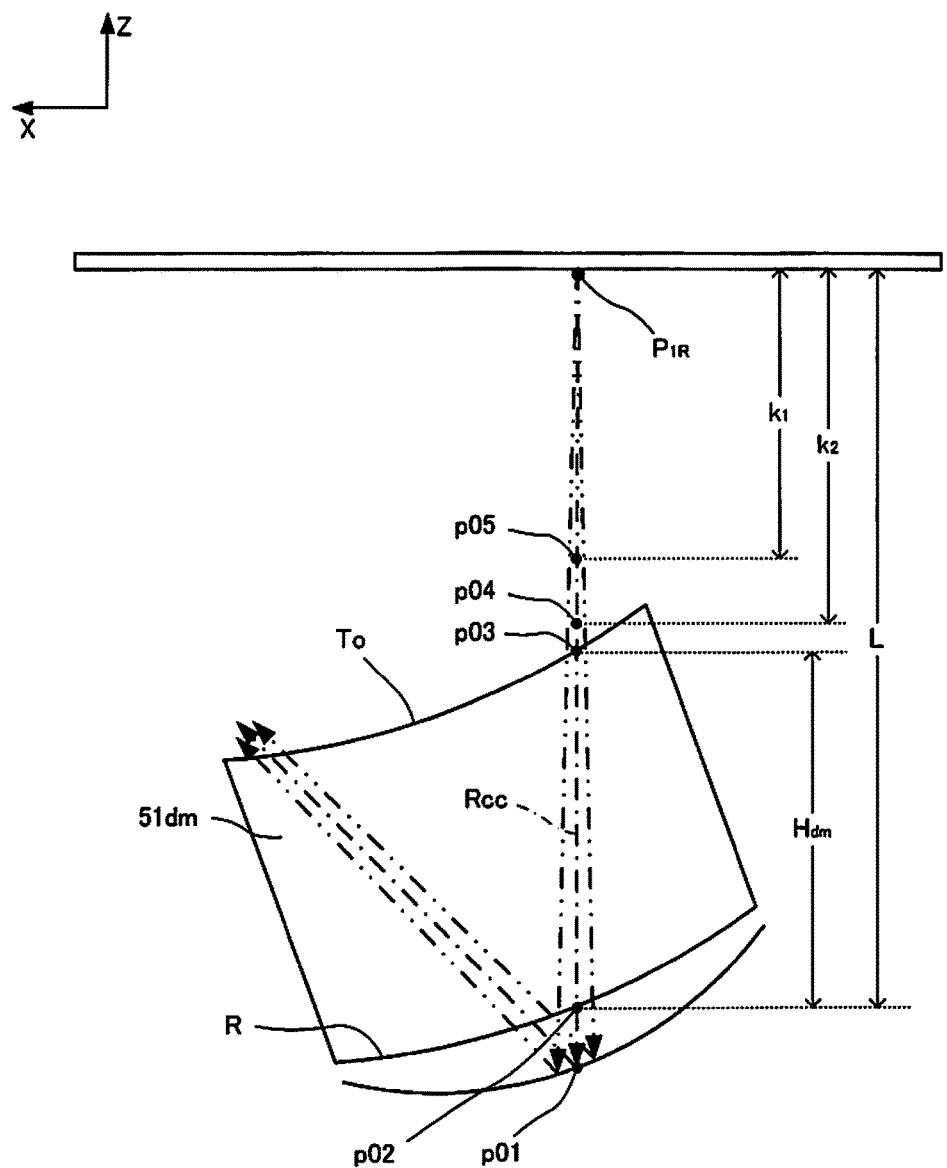
FIG. 9 is an oblique view describing the height of walls in the first mirror.

Note that in FIG. 7 to FIG. 9, wall 51dm is formed so that the height Hdm from point p02 satisfies equation (2). More specifically, the figures show a wall 51dm of Hdm<L−k2.

The other walls 51dm of the first mirror 51a are formed in the same way as the wall 51dm between the first concavity 51a1 and second concavity 51a2.

Note that the walls 51ds joining the walls 51dm are disposed in contact with the sub-scanning direction (X-axis) edges of the concavities between one wall 51dm and the next wall 51dm. There is no gap between the X-axis end of a concavity and the wall 51ds. The wall 51ds may be formed to any height not blocking the beam of the light incident to the concavities and the beam of light reflected from the concavities; and the height of walls 51ds on the side of light incident to the concavities and the height of walls 51ds on the side of light outgoing from the concavities may be the same or different. In this embodiment of the invention, as shown in FIG. 6, the walls 51ds on the side of the incident light are higher than the walls 51ds on the side of outgoing light.

As described above, unintended light (stray light) from outside the targeted range of the main scanning line corresponding to the concavities of the first mirror 51a can be blocked by the walls 51dm disposed between one concavity and the adjacent concavity. As a result, stray light being picked up by the sensor chip 21a can be prevented, and a drop in the image quality of scanning data due to stray light can be prevented.

(2-2) Walls of an Aperture Member

The walls 51e and walls 51f disposed to an aperture member 51c as shown in FIG. 3 are described next.

Figure 10:
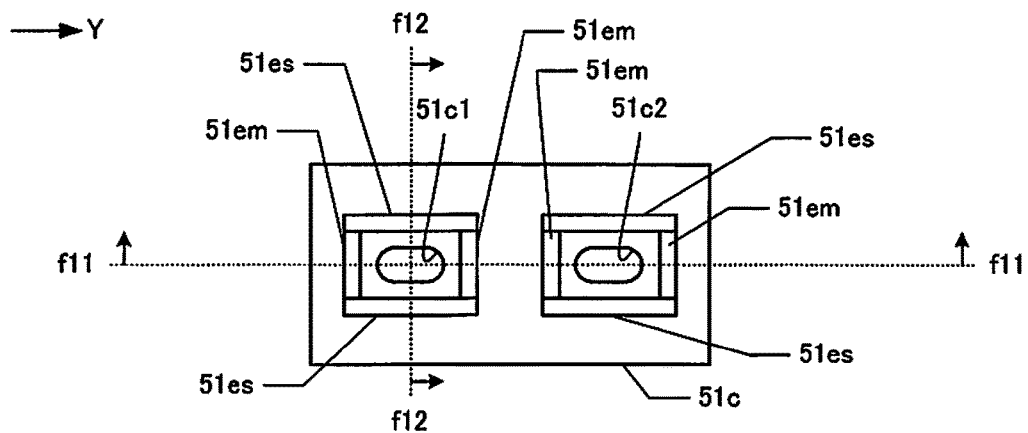
FIG. 10 is a plan view of the walls of an aperture member.
Figure 11:
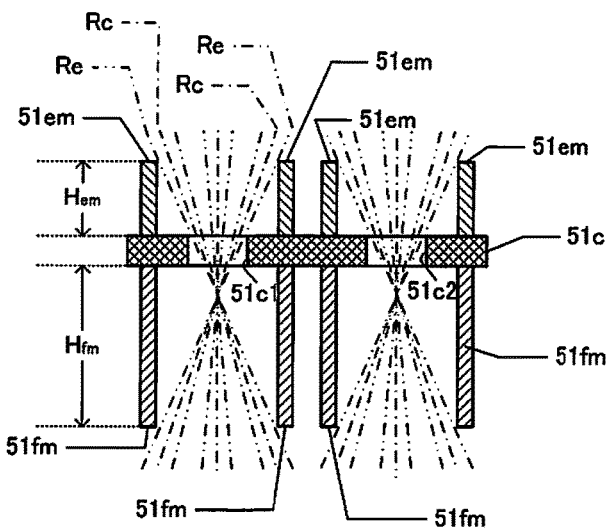
FIG. 11 is a plan view of the walls of an aperture member.
Figure 12:
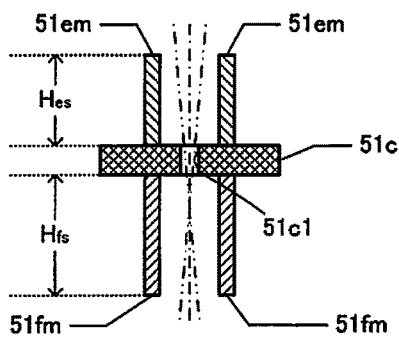
FIG. 12 is a plan view of the walls of an aperture member.

An aperture member 51c is a flat member extending in the main scanning direction (Y-axis), and a plurality of apertures (openings) are formed in the main scanning direction. As shown in FIG. 7, the aperture corresponding to the first concavity 51a1 is referred to as the first aperture 51c1, and the aperture corresponding to the second concavity 51a2 is referred to as the second aperture 51c2. FIG. 10 shows the aperture member 51c from the document P side of the optical path. FIG. 11 is a section view through f11-f11 in FIG. 10, and FIG. 12 is a section view through f12-f12 in FIG. 10.

Walls 51e are shield walls protruding from the aperture member 51c to the document P side of the optical path, and as shown in FIG. 10, include walls 51em disposed between the multiple apertures formed in the aperture member 51c, and walls 51es joining one wall 51em to another wall 51em. By connecting walls 51es by a pair of walls 51em, the strength of the walls 51em is increased and the angle of the walls 51em to the surface of the aperture member 51c is stable.

Likewise, walls 51e are shield walls protruding from the aperture member 51c to the sensor chip side of the optical path, and like the walls 51e shown in FIG. 10, include walls 51fm disposed between the multiple apertures, and walls 51fs joining one wall 51fm to another wall 51fm. By connecting walls 51fs by a pair of walls 51fm, the strength of the walls 51fm is increased and the angle of the walls 51fm to the surface of the aperture member 51c is stable.

As shown in FIG. 11, the walls 51em disposed on opposite sides of the first aperture 51c1 protrude from the aperture member 51c to a high and position not blocking the principal rays Rc (in this example, the two principal rays incident to the photoelectric conversion elements at both ends in the main scanning direction of the first sensor chip 21a1 corresponding to the first aperture 51c1).

As shown in FIG. 11, the walls 51em may also be disposed to a height Hem and position not blocking the outside-most rays Re, in addition to the principal rays Rc in the light beam incident to the photoelectric conversion elements at both ends in the main scanning direction of the first sensor chip 21a1. The other walls 51em disposed to the aperture member 51c are also disposed with the same shape described above.

As shown in FIG. 12, the walls 51es connecting one wall 51em to another wall 51em are disposed to a height Hes not obstructing light beams incident to the corresponding sensor chip (first sensor chip 21a1 in this example). The other walls 51es disposed to the aperture member 51c are also disposed with the same shape described above.

The walls 51fm disposed on opposite sides of the first aperture 51c1 protrude from the aperture member 51c to a high and position not blocking the principal rays Rc incident to the ends of the first sensor chip 21a1 in the main scanning direction.

As shown in FIG. 11, the walls 51fm may also be disposed to a height Hfm and position not blocking the rays Re closest to the second aperture 51c2, in addition to the principal rays Rc in the light beam incident to the first sensor chip 21a1. The other walls 51fm disposed to the aperture member 51c are also disposed with the same shape described above.

As shown in FIG. 12, the walls 51fs connecting one wall 51fm to another wall 51fm are disposed to a height Hfs not obstructing light beams incident to the corresponding sensor chip (first sensor chip 21a1 in this example). The other walls 51fs disposed to the aperture member Sic are also disposed with the same shape described above.

As a result, a drop in the image quality of scanning data due to stray light can be prevented by disposing walls 51e and walls 51f on the aperture member 51c.

If walls 51em are not disposed on the document P side between one aperture and the adjacent aperture, reflected light from a concavity (such as second concavity 51a2) other than the first concavity 51a1 of the first mirror 51a corresponding to the first aperture 51c1 cannot be prevented from passing through the first aperture 51c1, and a drop in image quality due to stray light may result.

In addition, if walls 51fm are not disposed on the sensor side between adjacent apertures, some light that past the first aperture 51c1 being incident to a concavity (such as second concavity 51b2) other than the first concavity 51b1 of the second mirror 51b corresponding to the first aperture 51c1 cannot be prevented, and a drop in image quality due to stray light may result.

However, these problems can be prevented by disposing walls 51em and walls 51fm to the aperture member 51c.

(2-3) Walls of a Second Mirror

The walls 51g disposed to the second mirror 51b (see FIG. 3) are described next.

Figure 13:
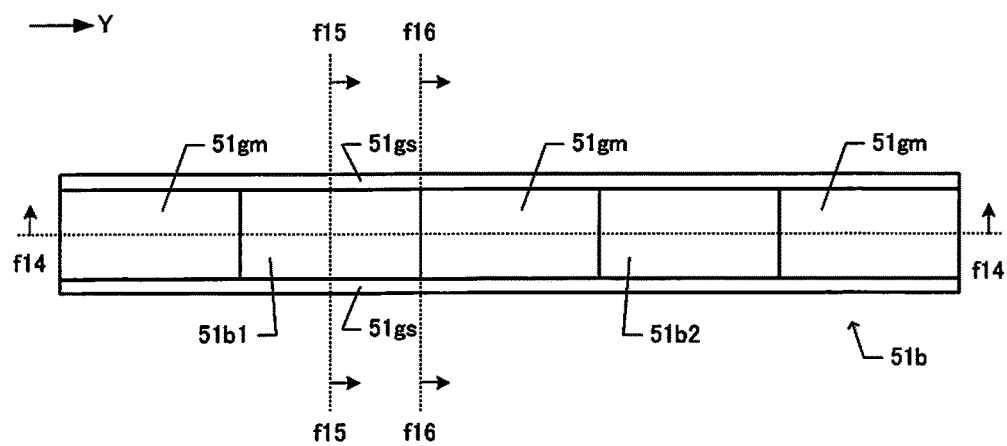
FIG. 13 is a plan view of walls of a second mirror.

The second mirror 51b has multiple concavities, and reflects light reflected from the multiple concavities of the first mirror 51a by the corresponding concavities to the corresponding sensor chip 21a. FIG. 13 illustrates the surface on which the concavities of the second mirror 51b are formed. Shown in FIG. 13 are the first concavity 51b1 corresponding to the first aperture 51c1, and the second concavity 51b2 corresponding to the second aperture 51c2.

Figure 14:
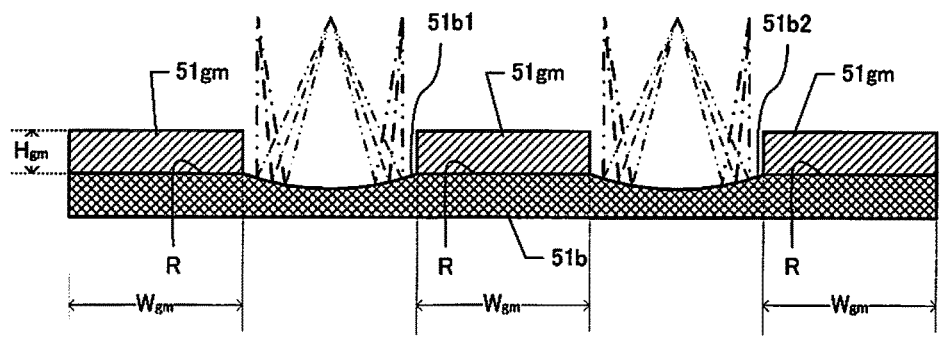
FIG. 14 is a plan view of walls of a second mirror.
Figure 15:
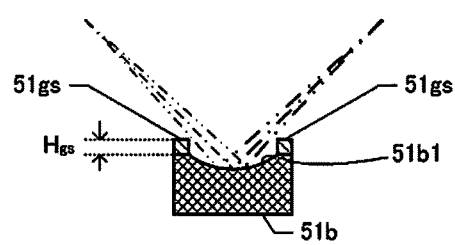
FIG. 15 is a plan view of walls of a second mirror.
Figure 16:
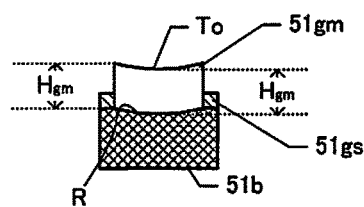
FIG. 16 is a plan view of walls of a second mirror.

FIG. 14 is a section view through line f14-f14 in FIG. 13, FIG. 15 is a section view through line f15-f15 in FIG. 13, and FIG. 16 is a section view through line f16-f16 in FIG. 13.

As shown in FIG. 13, walls 51g include a walls 51gm (examples of second walls) disposed between adjacent concavities of the second mirror 51b, and walls 51gs connecting adjacent walls 51gm. A wall 51gm disposed between a first concavity 51b1 and a second concavity 51b2 is disposed adjacent to the concavity on each side.

The walls 51gm protrude from the ridge line R formed by the first concavity 51b1 and second concavity 51b2, and there is no gap between the ridge line R and the wall 51gm. The protruding distal end To of the wall 51gm is concave, following the shape of the ridge line R as shown in FIG. 16.

The walls 51gs enclose the edges of the walls 51gm, first concavity 51b1, and second concavity 51b2. By the walls 51gs connecting the walls 51gm, the strength of the walls 51gm is improved, and the angle of the walls 51gm to the optical path is stable.

In FIG. 14, the thin dot-dash lines indicate the principal ray in the beam of incident light passing through the corresponding aperture and incident to a concavity of the second mirror 51b, and the thin dot-dot-dash lines indicate rays on the outside side of the light beam.

Also in FIG. 14, the bold dot-dash lines indicate the principal ray in the beam of reflected light from a concavity of the second mirror 51b to the corresponding sensor chip 21a, and the bold dot-dot-dash lines indicate rays on the outside side of the light beam.

The walls 51gm disposed on both sides of the first concavity 51b1 are configured in a shape protruding from the ridge line R in a shape (height Hgm, width Wgm) not interfering with the principal rays of the light beams incident to the photoelectric conversion elements located at the opposite ends in the main scanning direction (Y-axis) of the first sensor chips 21a1 corresponding to the first concavity 51b1.

In FIG. 15, the thin dot-dash lines indicate the principal ray in the beam of incident light passing through the first aperture 51c1 corresponding to the first concavity 51b1 and incident to the first concavity 51b1, and the thin dot-dot-dash lines indicate rays on the outside side of the light beam.

Also in FIG. 15, the bold dot-dash lines indicate the principal ray in the beam of reflected light from the first concavity 51b1 to the corresponding sensor chip 21a, and the bold dot-dot-dash lines indicate rays on the outside side of the light beam.

As shown in FIG. 15, the walls 51gs connecting one wall 51gm to another wall 51gm are disposed to the second mirror 51b to a height Hgs at which the wall 51gs that will not block the beam of incident light to the concavity of the second mirror 51b and the beam of reflected light from the concavity.

As described above, by disposing walls 51gm between adjacent concavities of the second mirror 51b, a drop in image quality in the scanning data due to stray light can be prevented.

If walls 51gm are not provided between the concavities of the second mirror 51b, some of the light reflected from the first concavity 51b1 being incident to a sensor chip (such as the second sensor chip 21a2) other than the first sensor chip 21a1 corresponding to the first concavity 51b1 cannot be prevented, and a drop in image quality due to stray light may result.

However, this problem can be prevented by providing walls 51gm to the second mirror 51b.

(2-4) Walls of the Sensor Substrate

The walls 51h (see FIG. 3) disposed to the substrate 210 to which the sensor chips 21a are disposed are described next.

Figure 17:
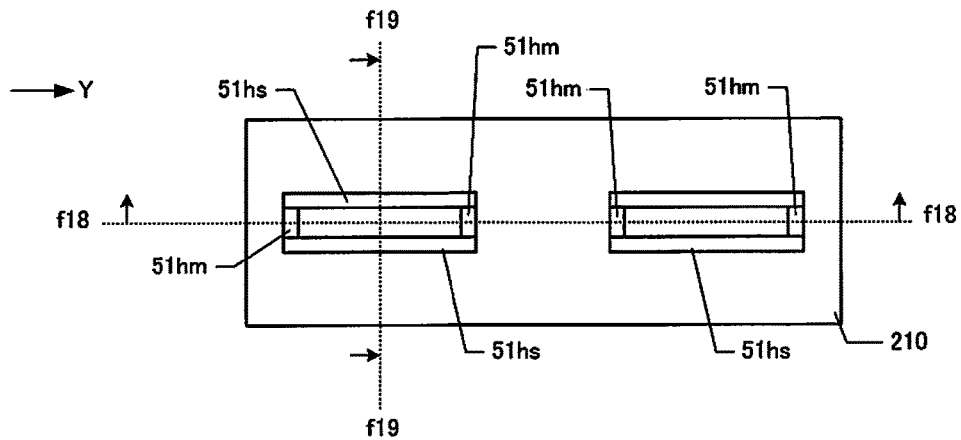
FIG. 17 is a plan view of walls of a sensor substrate.
Figure 18:
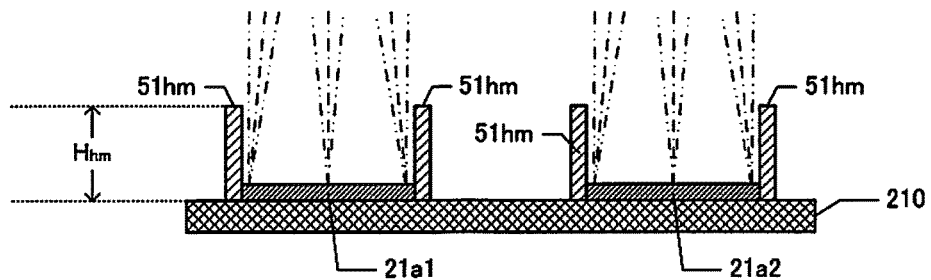
FIG. 18 is a plan view of walls of a sensor substrate.
Figure 19:
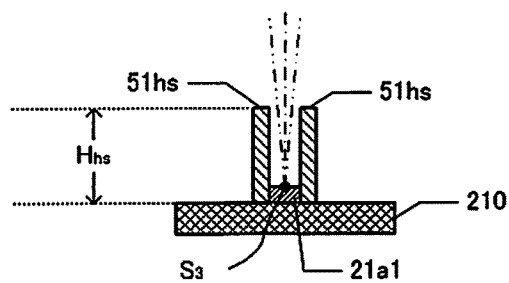
FIG. 19 is a plan view of walls of a sensor substrate.

FIG. 17 is a plan view of the substrate 210. FIG. 18 is a section view through line f18-f18 in FIG. 17, and FIG. 19 is a section view through line f19-f19 in FIG. 17. As shown in FIG. 17, the walls 51*h* include walls 51*hm* disposed between the multiple sensor chips 21*a* arrayed parallel to the main scanning direction on the substrate 210; and walls 51*hs* connecting the walls 51*hm*. One sensor chip 21*a* is surrounded by a pair of walls 51*hm* and a pair of walls 51*hs*.

In FIG. 18 and FIG. 19, the dot-dash lines indicate the principal rays in the beam of incident light from the second mirror 51*b* to the sensor chip 21*a*, and the dot-dot-dash lines indicate rays on the outside side of the light beam.

As shown in FIG. 18, the walls 51*hm* are configured in a shape not interfering with the principal rays of the light beams incident to the photoelectric conversion elements located at both ends in the main scanning direction of the corresponding sensor chip 21*a*. More specifically, in this embodiment of the invention, the walls 51*hm* are formed perpendicularly to the substrate 210, and the principal rays incident from the inside to the outside of the sensor chip 21*a* at the Y-axis ends of the sensor chip 21*a* are not blocked by the walls 51*hm*.

As shown in FIG. 19, the walls 51*hs* connecting one wall 51*hm* to the other wall 51*hm* are configured to a height Hhs not interfering with the light beam incident to the first sensor chip 21*a*1. Note that RGB photoelectric conversion elements that receive light from the same position on the main scanning line of the document P are disposed to the imaging area S3 of the light beam shown in FIG. 19.

As described above, by disposing walls 51*hm* protruding from the substrate 210 between the sensor chips 21*a* on the substrate 210, a drop in image quality in the scanning data due to stray light can be prevented.

If walls 51*hm* are not provided, some of the light reflected from a concavity (such as the second concavity 51*b*2) other than the first concavity 51*b*1 of the second mirror 51*b* corresponding to the first sensor chip 21*a*1 being incident to the first sensor chip 21*a*1 cannot be prevented, and a drop in image quality due to stray light may result.

However, this problem can be prevented by providing walls 51*hm* to the substrate 210.

(3) Scanning Process

The scanning process in this embodiment of the invention is described next with reference to the flow chart in FIG. 20.

Figure 20:
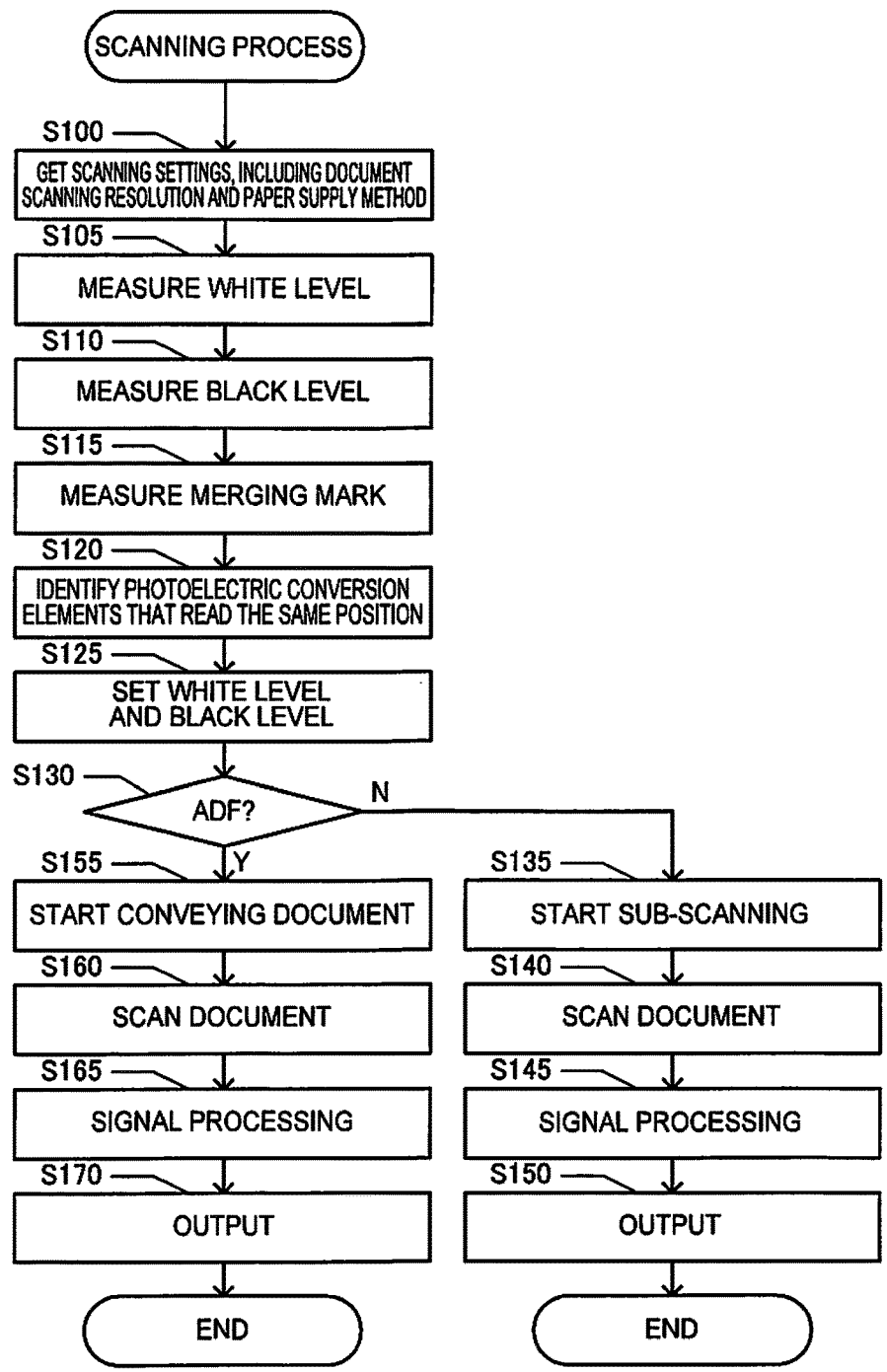
FIG. 20 is a flow chart of the scanning process.

When the user directly or indirectly selects the document scanning resolution and paper feed method (ADF or document platen), and commands scanning to start, the controller 10 receives the scan command and starts the scanning process shown in FIG. 20. When the scanning process starts, the controller 10 gets the scanning settings, including the document scanning resolution and the paper feed method (step S100). Note that in this example the user can select and set the desired resolution from among the plural document scanning resolutions that can be set for reading light reflected from a moving document.

Next, the controller 10 measures image shading. More specifically, the lowest level of light detectable by the sensor chip is the black level, and the highest level of detectable light is the white level, but the black level and white level can vary according to the sensor, light source, and other characteristics. For example, sensor characteristics may vary due to noise such as dark current, sensor manufacturing errors, and aging, and the black level and white level can vary according to such variations. Therefore, to scan with high quality, imaging shading is preferably measured before reading a document to determine at least one of the black level and white level.

The controller 10 in this example first measures the white level (step S105). More specifically, before reading the document, the controller 10 controls the first reading unit (and the second reading unit if scanning both sides) to read the white calibration plate of the calibration plate 61. As a result, because output indicating the measurement acquired by the first sensor 21 (and the second sensor 22 if scanning both sides) from the white calibration plate is acquired, the controller 10 acquires the output as the white level.

Next, the controller 10 measures the black level (step S110). More specifically, before reading the document, the controller 10 controls the first reading unit (and the second reading unit if scanning both sides) to read the black calibration plate of the calibration plate 61. As a result, because output indicating the measurement acquired by the first sensor 21 (and the second sensor 22 if scanning both sides) from the black calibration plate is acquired, the controller 10 acquires the output as the black level.

Next, the controller 10 measures the merging mark (step S115). More specifically, before scanning the document, the controller 10 controls the first reading unit to scan the merging mark of the calibration plate 61. As a result, the results of scanning the merging mark are output from the multiple sensor chips of the first sensor 21. Note that because there is no need to synthesize the output of the second sensor 22 in this embodiment, the merging mark is not scanned by the second sensor 22.

Next, the controller 10 identifies the photoelectric conversion elements that read the same position (step S120). For example, using the example in FIG. 5, the controller 10 identifies photoelectric conversion elements E5, E6 of the first sensor chip 21*a*1, and photoelectric conversion elements E4, E5 of second sensor chip 21*a*2, as the photoelectric conversion elements that read the same position. The controller 10 executes the same process for each sensor chip 21*a*, and identifies the photoelectric conversion elements in each sensor chip that read the same position.

Next, the controller 10 sets the black level and white level (step S125). That is, the controller 10, based on the white level measured in step S105 and black level measured in step S110, sets the white level and black level for each photoelectric conversion element. More specifically, based on the white level measured in step S105 and black level measured in step S110, the control unit 13 sets the gain to enable measuring gradations between the white level and black level in the effective detection range.

Next, the controller 10 determines if the paper supply method is by ADF or not (step S130). More specifically, the controller 10 references the scanning settings acquired in step S100 to determine if the paper supply method is by ADF or using the scanning platen. If the controller 10 determines in step S130 that the paper supply method is not by ADF, that is, that a document on the document platen is to be scanned, the controller 10 starts sub-scanning (step S135). More specifically, the controller 10 outputs a control signal to the sub-scanning device 41 to move the first sensor 21, first light source 31, and first optical system 51 in the sub-scanning direction.

The controller 10 reads the document during the sub-scanning operation (step S140). More specifically, the controller 10 controls the first sensor 21 to read, and acquires the read results from the sensor chips 21*a* of the first sensor 21.

Next, the controller 10 signal processes the output from the sensor chips 21*a* (step S145). More specifically, the controller 10 digitizes the output of the sensor chips 21*a*, adjusts the gain according to the white level and black level set in step S125, executes a synthesizing process causing the photoelectric conversion elements identified in step S120 to output one pixel, converts value and color, crops the document, applies edge enhancement, and executes other signal processing operations.

These processes may be applied sequentially to the line by line results read in step S140, or in a batch after all read results are acquired.

Next, the controller 10 outputs the scanning data (step S150). More specifically, when one page of data synthesized in step S145 is accumulated, the controller 10 generates scanning data for the one page, and outputs the scanning data through the communicator 70 to the computer 90.

If the controller 10 determines in step S130 that the paper supply method is by ADF, the controller 10 starts conveying the document (step S155). More specifically, the controller 10 outputs a control signal to the sub-scanning device 41 to move the first reading unit to a specific scanning position. The controller 10 then outputs a control signal to the conveyance device 40 to convey the document through the conveyance path.

While the document is being conveyed, the controller 10 reads the document (step S160). More specifically, the controller 10 controls the first sensor 21 to read, and acquires the read results from the sensor chips 21a of the first sensor 21. Note that if duplex scanning is selected in step S100, the controller 10 also controls the second sensor 22 to read, and acquires the read results from the second sensor 22.

Next, the controller 10 signal processes the output (step S165). More specifically, the controller 10 digitizes the output of the sensor chips 21a (including the output from the second sensor 22 if duplex scanning is selected), adjusts the gain according to the white level and black level set in step S125, executes a synthesizing process causing the photoelectric conversion elements identified in step S120 to output one pixel, converts value and color, crops the document, applies edge enhancement, and executes other signal processing operations. These processes may be applied sequentially to the line by line results read in step S160, or in a batch after all read results are acquired. Note that because there is no need to synthesize the read results from the second sensor 22, the read results from the second sensor 22 are not subject to the synthesis process.

Next, the controller 10 outputs the scanning data (step S170). More specifically, when one page of data synthesized in step S165 is accumulated, the controller 10 applies image processing including cropping and edge enhancement, for example, generates scanning data for the one page, and outputs the scanning data through the communicator 70 to the computer 90. If duplex scanning was selected, the controller 10 generates the scanning data using the one page of data synthesized in step S165 and the one page of data read from the back in step S160, and then outputs to the computer 90.

(4) Other Embodiments

The invention is described with reference to desirable embodiments above, but the invention is not so limited and can be varied in many ways. For example, the scanner described above may be a component of a multifunction device, which is an electronic device that is also used for other purposes.

The merging mark may also be configured in many ways, and may be two lines or graphic of another shape. During synthesis, images may also be synthesized to eliminate deviation (such as skewing) of the sensor chips in the sub-scanning direction.

To superimpose the outputs of photoelectric conversion elements that read the same part of the document, a statistical value (such as the average) of scanning data from one sensor chip and scanning data from the other sensor chip may be acquired and used, or the scanning data from one of the sensor chips may be used.

Scanning data generated by scanning may be output to a computer 90, output and stored to a storage medium such as USB memory installed to the device, output to a print mechanism and printed (or copied), or output and displayed on a monitor.

Alternatively, the final scanning data may be generated by outputting an area detection image to a computer 90, and applying image analysis and synthesis by a driver program or application program of the computer 90. In this configuration, the computer 90 may be considered part of the scanner.

The first mirror may have multiple concavities reflecting light from the document. More specifically, the first mirror may be configured as needed to form an optical path to the sensor group by changing the direction of travel of light from a document by reflection. The light from a document may be any light output from the document as a result of exposing the document to light from a light source, and in many configurations is reflected light, but may be fluorescent light, for example.

The first mirror has multiple concavities. More specifically, different optical paths can be formed by the concavities, and light from a document can be guided through multiple optical paths to multiple sensor chips corresponding to the respective optical paths.

In addition, the concavities may be configured as surfaces that reflect and converge parallel incident light on a focal point, and may be surfaces configured as an optical system (such as a reduction optical system that reduces the size of the image) that changes the size of the image corresponding to the light from a document.

The number of concavities is not limited insofar as the configuration at least guides light from multiple areas in the main scanning direction to multiple sensor chips. For example, a configuration that is a number corresponding to the number of sensor chips in a sensor can be used.

In addition, multiple mirrors may be disposed to the same optical path. For example, a configuration that converges light through two reflections by two concavities may be used. The focal length and curvature of a concavity is not specifically limited, and may be changed according to the size of the scanner or the configuration of the optical system, for example.

A sensor may include multiple sensor chips each having a photoelectric conversion element line that senses light reflected by a concavity. In other words, a sensor may be configured in any form enabling multiple sensor chips to read light reflected by multiple concavities. A photoelectric conversion element line of multiple photoelectric conversion elements is formed in each of the multiple sensor chips, and the direction in which the photoelectric conversion elements are arranged is the main scanning direction.

Note that the sensor chip has photoelectric conversion elements arranged at least in the main scanning direction, and may also have photoelectric conversion elements at multiple positions in the sub-scanning direction. In the latter case, photoelectric conversion elements may be at multiple positions in the sub-scanning direction in the sensor chip, or by arraying sensor chips in the sub-scanning direction, photoelectric conversion elements may be disposed at multiple positions in the sub-scanning direction.

Note that in a configuration in which photoelectric conversion elements are at multiple positions in the sub-scanning direction, the photoelectric conversion elements at multiple positions in the sub-scanning direction may be used to form images of different colors, or be used to form an image of one line in the main scanning direction by combining their outputs.

The aperture member is disposed between the first mirror and the sensor in the optical path of light reflected by a concavity, and there may be multiple apertures paired one-to-one with the concavities. More specifically, any configuration that has an aperture disposed to each optical path of light reflected by each concavity, and focuses the light on the sensor chip after the light on the optical path is collimated by the aperture, may be used. An aperture corresponds one-to-one with a concavity. As a result, while there is always an aperture corresponding to a concavity, multiple concavities may correspond to each aperture. For example, a configuration that has multiple concavities on an optical path, and uses a single aperture to focus light from multiple concavities on the sensor chip, is conceivable.

The sensor detecting light guided by a reduction optics system may be configured in any form enabling sensing light reflected by a concavity of a first mirror. For example, as described in the foregoing embodiments, the sensor may comprise multiple sensor chips arrayed in the main scanning direction, or comprising a single line sensor disposed lengthwise parallel to the main scanning direction.

Note that a configuration having a third mirror with multiple concavities that reflect light from a document to a concavity corresponding to the first mirror, and an aperture different from the walls disposed to the optical path between the third mirror and the first mirror, is conceivable. In this configuration, the second mirror 51$b$ in the foregoing embodiment may be understood as equivalent to a first mirror, and the first mirror 51$a$ in the foregoing embodiment as equivalent to a third mirror.

Furthermore, the foregoing embodiment describes a configuration having the walls disposed between the concavities of the first mirror, and the walls disposed between the concavities of the second mirror, adjacent to concavities on both sides of the wall, but may be configured in other ways insofar as the they are disposed to a height not blocking the principal rays of light reflected from the ends of the defined range.

Figure 21:
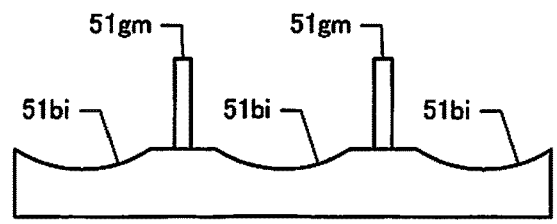
FIG. 21 schematically illustrates another embodiment of the invention.
Figure 22:
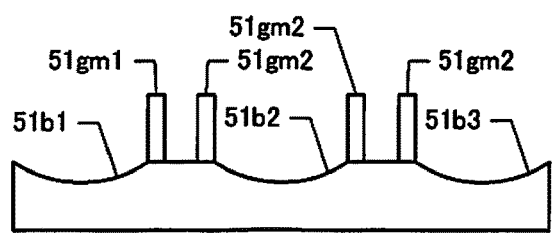
FIG. 22 schematically illustrates another embodiment of the invention.

As shown in FIG. 21, for example, the walls 51$gm$ may be disposed separated from the concavities 51$bi$ on both sides. Alternatively, as shown in FIG. 22, a wall 51$gm$1 that functions as a shield wall for the first concavity 51$b$1, and a separate wall 51$gm$2 that functions as a shield wall for the second concavity 51$b$2, may be disposed between the first concavity 51$b$1 and the second concavity 51$b$2.

The protruding distal ends of the walls between the concavities of the first mirror in the foregoing embodiment are shaped according to the profile of the ridge line between the concavities of the first mirror, but the shape of the protruding end of the walls may be configured in other ways insofar as they are of a height not blocking the principal rays of light reflected from the ends of the defined range. For example, the shape of the protruding end may be flat.

In the embodiments described above, the walls disposed between first aperture and second aperture of the aperture member are formed with the walls corresponding to the first aperture separate from the walls corresponding to the second aperture, but may be configured in other ways insofar as the they are disposed to a height not blocking the principal rays of light reflected from the ends of the defined range.

Figure 23:
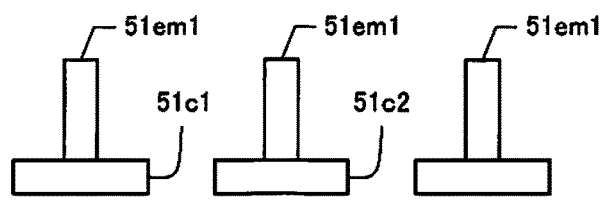
FIG. 23 schematically illustrates another embodiment of the invention.
Figure 24:
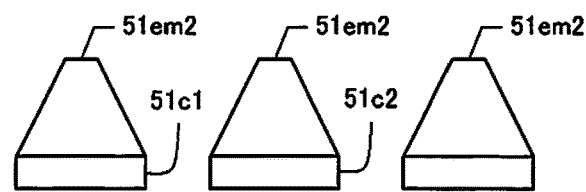
FIG. 24 schematically illustrates another embodiment of the invention.

For example, as shown in FIG. 23, a wall that functions as a shield wall for the first aperture 51$c$1, and a wall that functions as a shield wall for the second aperture 51$c$2, between the first aperture 51$c$1 and the second aperture 51$c$2 may be formed integrally as walls 51$em$1. In addition, as shown in FIG. 24, the walls 51$em$2 between one aperture and the next may be formed adjacent to the apertures on both sides of the walls.

Furthermore, in the embodiment described above, the walls between a first sensor chip and second sensor chip on the substrate are separately formed as a wall for the purpose of blocking light to the first sensor chip, and a wall for the purpose of blocking light to the second sensor chip, but may be configured in other ways insofar as the they are disposed to a height not blocking the principal rays of light reflected from the ends of the defined range.

Figure 25:
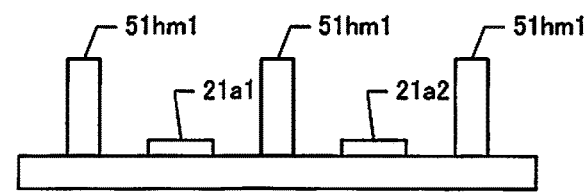
FIG. 25 schematically illustrates another embodiment of the invention.
Figure 26:
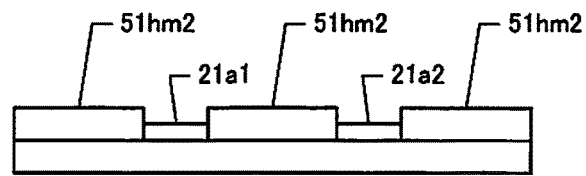
FIG. 26 schematically illustrates another embodiment of the invention.

For example, as shown in FIG. 25, a wall for the purpose of blocking light to the first sensor chip 21$a$1, and a wall for the purpose of blocking light to the second sensor chip 21$a$2, may be formed integrally as walls 51$hm$1. In addition, the walls may be formed adjacent to the sensor chips on both sides as indicated by the walls 51$hm$2 in FIG. 26.

Note that the walls described in the foregoing embodiments may be varied in many ways, including omitting some walls, and connecting walls of different members to each other. For example, one or more of wall 51$d$, wall 51$e$, wall 51$f$, wall 51$g$, and wall 51$h$ may be omitted, or only one of wall 51$d$, wall 51$e$, wall 51$f$, wall 51$g$, and wall 51$h$ may be provided while the others are omitted. In addition, wall 51$d$ and wall 51$e$ may be connected together. In addition, wall 51$f$ and wall 51$g$ may be connected together. In addition, wall 51$g$ and wall 51$h$ may be connected together. In addition, wall 51$ds$, wall 51$es$, wall 51$fs$, wall 51$gs$, and wall 51$hs$ may be omitted.

Furthermore, the mirrors described in the foregoing embodiments may be replaced by equivalent lenses.

Mirrors may also be added to bend the optical path.

The sensor may also be configured without color filters, and the sensor may be a monochrome sensor that does not differentiate colors.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:
1. A scanner comprising:
a first mirror having multiple concavities configured to reflect light from a document;
a sensor configured to sense light reflected by a concavity of the first mirror; and
a wall disposed to the first mirror and protruding from between the multiple concavities,
the sensor including multiple sensor chips corresponding one-to-one with the concavities of the first mirror,
light from a defined range of a main scanning line of the document being reflected by a first concavity of the first mirror and incident to a first sensor chip corresponding to the first concavity, and being reflected by a second concavity of the first mirror and incident to a second sensor chip corresponding to the second concavity,
the first concavity and the second concavity being aligned adjacently in a main scanning direction;
the sensor chips being aligned in the main scanning direction, and the wall protruding from between the first concavity and the second concavity to a height Hdm equal to $(0<H_{dm}<L-(q+W_{dm})/(2 \tan \theta_2))$ where L is a distance to the first mirror from a virtual plane, which is a position where an image formed through the first mirror on the sensor chip is in focus, q is the length of the defined range on the main scanning line in the virtual plane, $\theta_2$ is the angle, in a plane including a principal ray from an end of the defined range and the main scanning line, between a perpendicular to the main scanning line and the principal ray, and $W_{dm}$ is a width in the main scanning direction of the wall disposed to a position equidistant from the first concavity and the second concavity.

2. The scanner according to claim 1, further comprising:
a second mirror having multiple concavities, and configured to reflect to the sensor, by the corresponding concavities, light reflected by the multiple concavities of the first mirror; and
an aperture that is different from the walls and is positioned between the first mirror and the second mirror on the optical path.

3. The scanner according to claim 2, further comprising:
a different wall that is different from the wall and is disposed to the second mirror and protruding from between multiple concavities of the second mirror.

4. The scanner according to claim 1, further comprising:
a third mirror having multiple concavities configured to reflect light from the document to a concavity corresponding to the first mirror; and
an aperture that is different from the walls and is positioned between the third mirror and the first mirror on the optical path.

5. The scanner according to claim 1, wherein:
the walls are adjacent to concavities of the first mirror on both sides of the wall.

6. The scanner according to claim 1, wherein:
the walls protrude from a ridge between concavities of the first mirror.

7. The scanner according to claim 1, wherein:
a protruding end of the wall is shaped conforming to the shape of the ridge formed by concavities of the first mirror.

8. A method of generating scanning data using a scanner including a first mirror having multiple concavities configured to reflect light from a document, a sensor configured to sense light reflected by a concavity of the first mirror, and a wall disposed to the first mirror and protruding from between the multiple concavities, comprising:
reading the document by the sensor and generating scanning data of the document,
a protruding end of the wall being shaped conforming to the shape of the ridge formed by concavities of the first mirror.

9. A scanner comprising:
a first mirror having a plurality of concavities configured to reflect light from a document;
a sensor configured to sense light reflected by a concavity of the first mirror; and
a wall disposed to the first mirror and protruding from between the plurality of concavities,
a protruding end of the wall being shaped conforming to the shape of the ridge formed by concavities of the first mirror.

10. The scanner according to claim 9, wherein:
the plurality of concavities of the first mirror includes a first concavity and a second concavity that are aligned in a main scanning direction,
the sensor includes a plurality of sensor chips corresponding one-to-one with the concavities of the first mirror, the plurality of sensor chips includes a first sensor chip corresponding to the first concavity and a second sensor chip corresponding to the second concavity, and the first sensor chip and the second sensor chip are aligned in the main scanning direction, and
light from a defined range of a main scanning line of the document is reflected by the first concavity of the first mirror and incident to the first sensor chip, and is reflected by the second concavity of the first mirror and incident to the second sensor chip, and the defined range is a range where a part of an area of the document on the main scanning line read by the first sensor chip and a part of an area of the document on the main scanning line read by the second sensor chip overlap each other.

* * * * *